(12) United States Patent
Saeki et al.

(10) Patent No.: US 8,222,858 B2
(45) Date of Patent: Jul. 17, 2012

(54) ELECTRIC POWER SUPPLY SYSTEM

(75) Inventors: Hibiki Saeki, Saitama (JP); Satoshi Aoyagi, Saitama (JP); Takuya Shirasaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1055 days.

(21) Appl. No.: 12/128,461

(22) Filed: May 28, 2008

(65) Prior Publication Data
US 2008/0297113 A1    Dec. 4, 2008

(30) Foreign Application Priority Data
May 28, 2007    (JP) ................. 2007-140732

(51) Int. Cl.
  H02J 7/00    (2006.01)
  H01M 10/44    (2006.01)
  H01M 10/46    (2006.01)
(52) U.S. Cl. ............ 320/101; 320/103; 320/128; 429/9; 429/13; 429/22; 429/23
(58) Field of Classification Search .............. 320/101, 320/103, 128; 429/9, 13, 22–23
  See application file for complete search history.

(56) References Cited

U.S. PATENT DOCUMENTS
2003/0003334 A1 * 1/2003 Yoshizawa et al. ............. 429/22
2004/0166387 A1    8/2004  Imamura et al.
2006/0063044 A1    3/2006  DeVries
2006/0194082 A1 *  8/2006  Tucker et al. ................. 429/9

FOREIGN PATENT DOCUMENTS
JP    2006-196221    7/2006
WO    WO-2005004269    1/2005

OTHER PUBLICATIONS
European Office Action for Application No. 08009715.7, dated Jun. 10, 2008.

* cited by examiner

Primary Examiner — Samuel Berhanu
(74) Attorney, Agent, or Firm — Nelson Mullins Riley & Scarborough LLP; Anthony A. Laurentano

(57) ABSTRACT

An electric power supply system can determine a sharing ratio of an electric power so as to increase and decrease an output electric power supplied by an electric power generator in accordance with an output electric power value required for the electric power supply system, in a fuel cell following region where a frequency of a magnitude of the electric power is equal to or higher than a predetermined value in a frequency distribution of a magnitude of the electric power, and can determine the sharing ratio of the electric power so as to increase an output electric power supplied by an electricity storage device, in an assist region where the frequency is lower than a predetermined value in the frequency distribution, and can prevent an excess of discharging from an electricity storage device.

11 Claims, 24 Drawing Sheets

ELECTRIC POWER SUPPLY SYSTEM

CROSS-REFERENCE TO RELATED APPLICATION(S)

This application claims the foreign priority benefit under Title 35, United States Code, §119 (a)-(d), of Japanese Patent Application No. 2007-140732, filed on May 28, 2007 in the Japan Patent Office, the disclosure of which is herein incorporated by reference in its entirety.

BACKGROUND OF THE INVENTION

Field of the Invention

The present invention relates to an electric power supply system having a power generator.

For an electric power supply, JP2006-196221A discloses a fuel cell system. The fuel cell system computes an electric power generating property of a fuel cell on the basis of an output voltage and an output current of the fuel cell. The fuel cell system computes an output electric power of the fuel cell system, which can be supplied to an electrical load and computes the efficiency of the fuel cell system on the basis of the output electric power and an energy of combustion for a fuel gas of the fuel cell. Further, the fuel cell system computes an accumulative energy efficiency in charging a secondary battery (chargeable device). The fuel cell system computes a total system efficiency based on the output electric power, the energy efficiency of the secondary battery, and an output electric power required for the fuel cell.

The fuel cell system determines a distribution of the output electric power between the fuel cell and the secondary battery (chargeable device) in order to maximize the total system efficiency. In other words, the fuel cell system determines the distribution of the output electric power between the fuel cell and the secondary battery (chargeable device) so as to minimize a total loss, which is a sum of a fuel cell loss and a secondary battery loss.

However, the fuel cell system disclosed in JP2006-196221A has an problem in that the secondary battery (electricity storage device) excessively discharges electricity because the output electric power for the fuel cell and the secondary battery is distributed so as to minimize the fuel cell loss and the secondary battery loss. As the secondary battery loss is smaller than the fuel cell loss, a large amount of the output electric power is distributed to the secondary battery.

BRIEF SUMMARY OF THE INVENTION

An aspect of the present invention provides an electric power supply system which can prevent an excess of electricity discharged by an electricity storage device.

Preferably, an electric power supply system comprising: an electric power generator for generating an electric power; an electricity storage device for receiving and charging the electric power from the electric power generator, and supplying the electric power to an electrical load; an electric power distributing device for distributing the electric power to the electrical load, from the electric power generator and the electricity storage device at a sharing ratio therebetween; and a control unit for determining the sharing ratio of the electric power and controlling the electric power distributing device, wherein the control unit detects a frequency distribution of the output electric power of the electric power supply system regarding a magnitude of the electric power, which includes an assist region and a fuel cell following region, the fuel cell following region having a high frequency of the magnitude of the electric power, and an assist region having a low frequency of the magnitude of the electric power, wherein the control unit determines to operate the electric power distributing device to output the electric power from the electric power generator and the electricity storage device at the sharing ratio, and wherein a value of the sharing ratio of the electricity storage device in the assist region is higher than a value of the sharing ratio of the electricity storage device in the fuel cell following region.

The electric power supply system can limit the output electric power supplied by the electricity storage device in the fuel cell following region where a frequency of being output is high in the output frequency distribution in the predetermined time interval. The electric power supply system can prevent an excess of electricity discharged by the electricity storage device and efficiently use the electric power of the electricity storage device. Further, the electric power supply system can reduce a frequency of running out of an assisting operation that the electricity storage device assists generation of electricity by providing an output electric power for an electrical load, and can improve a fuel consumption of the electric power generator.

The control unit generates a following upper limit value by adding an average value of the electric power of the electric power supply system and a value corresponding to a standard deviation determined by the frequency distribution for the electric power, wherein, when the electric power of the electric power supply system is lower than the following upper limit value, a high frequency of a magnitude of the electric power is in the fuel cell following region of the frequency distribution of the electric power of the electric power supply system regarding the magnitude of the electric power, and wherein, when the electric power of the electric power supply system is equal to or higher than the following upper limit value, a low frequency of the magnitude of the electric power is in the assist region of the frequency distribution of the output electric power of the electric power supply system.

The electric power generator is a fuel cell, and the control unit computes an efficiency of the output electric power of the fuel cell in operation and takes a following lower limit value for a value of an output electric power of the fuel cell to maximize the efficiency of the output electric power of the fuel cell, and takes the following lower limit value for a predetermined value of the output electric power in a light-load region where the fuel cell is deteriorated, and wherein, when the output electric power of the fuel cell is equal to or higher than the following lower limit value, the control unit determines the distribution of the output electric power to the fuel cell and the electricity storage device so as to increase and decrease the output electric power supplied by the fuel cell in accordance with the output electric power required for the electric power supply system.

The electric power generator is a fuel cell, and the control unit computes an efficiency of the output electric power of the fuel cell in operation and takes a following lower limit value for an output electric power value of maximizing the efficiency of the output electric power of the fuel cell or for a predetermined output electric power value in a light-load region where the fuel cell is deteriorated, and wherein, when the output electric power of the fuel cell is equal to or higher than the following lower limit value, the control unit determines the distribution of the output electric power to the fuel cell and the electricity storage device so as to increase and decrease the output electric power supplied by the fuel cell in accordance with the change of the output electric power value required for the electric power supply system.

The electric power supply system can efficiently generate electricity by setting the following lower limit value of the fuel cell in accordance with the change in the efficiency of the output electric power of the fuel cell in operation.

The electric power supply system includes an auxiliary device electric power consumption detecting unit for detecting an electric power consumption consumed by auxiliary devices of the fuel cell, and wherein the control unit computes the efficiency of the output electric power of the fuel cell on the basis of the electric power consumption of the auxiliary devices and current-voltage characteristics of the fuel cell, whereof a voltage is detected by a voltage detecting unit, and a current is detected by a current detecting unit.

The electric power supply system can determine the following lower limit value on the basis of the current-voltage characteristics of the fuel cell and the electric power consumption of the auxiliary devices, which are changed in operation, and can improve the efficiency of the output electric power.

The control unit includes a temperature detecting unit for detecting a temperature of the fuel cell and computes the efficiency of the output electric power of the fuel cell on the basis of the temperature of the fuel cell.

The electric power supply system can use the temperature of the fuel cell to determine the following lower limit value and improve the efficiency of the output electric power of the fuel cell.

The control unit includes a humidity detecting unit for detecting a humidity of the fuel cell and computes the efficiency of the output electric power of the fuel cell on the basis of the humidity of the fuel cell.

The electric power supply system can use the humidity of the fuel cell to determine the following lower limit value and improve the efficiency of the output electric power of the fuel cell.

The control unit includes a pressure detecting unit for detecting a pressure of the fuel cell and computes the efficiency of the output electric power of the fuel cell on the basis of the pressure of the fuel cell.

The electric power supply system can use the pressure of the fuel cell to determine the following lower limit value and improve the efficiency of the output electric power of the fuel cell.

The control unit stops generating electricity of the fuel cell when a value of the output electric power required for the fuel cell is lower than the following lower limit value.

The electric power supply system can stop generating electricity of the fuel cell when the efficiency of the output electric power is low and efficiently use the output electric power.

The control unit changes the following upper limit value on the basis of the temperature of the fuel cell which the temperature detecting unit detects.

The fuel cell system can immediately warm up the electric power generator because the fuel cell can generate electricity above the following upper limit value determined by the standard deviation value by raising the following upper limit value in dropping a temperature of the electric power generator.

The control unit changes the following upper limit value on the basis of a remaining capacity of the electricity storage device which a remaining capacity detecting unit detects.

The electric power supply system can prevent the remaining capacity of the electricity storage device from reducing radically by raising the following upper limit value in accordance with the remaining capacity of the electricity storage device, whereby increasing the output electric power of the electric power generator.

The electric power supply system of the present invention can determine the distribution of the output electric power so as to increase and decrease the output electric power supplied by the electric power generator in accordance with the change of the output electric power value required for the electric power supply system, in the where the frequency of being output is equal to or higher than a predetermined value in the frequency distribution of the output electric power, and can determine the distribution of the output electric power so as to increase the output electric power supplied by electricity storage device, in the assist region where the frequency of being output is lower than a predetermined value in the frequency distribution, and accordingly can prevent the excess of discharging from the electricity storage device.

DETAILED DESCRIPTION OF THE PREFERRED EMBODIMENTS

Preferred embodiments will be described with reference to drawings in detail.

First Embodiment

Figure 1:
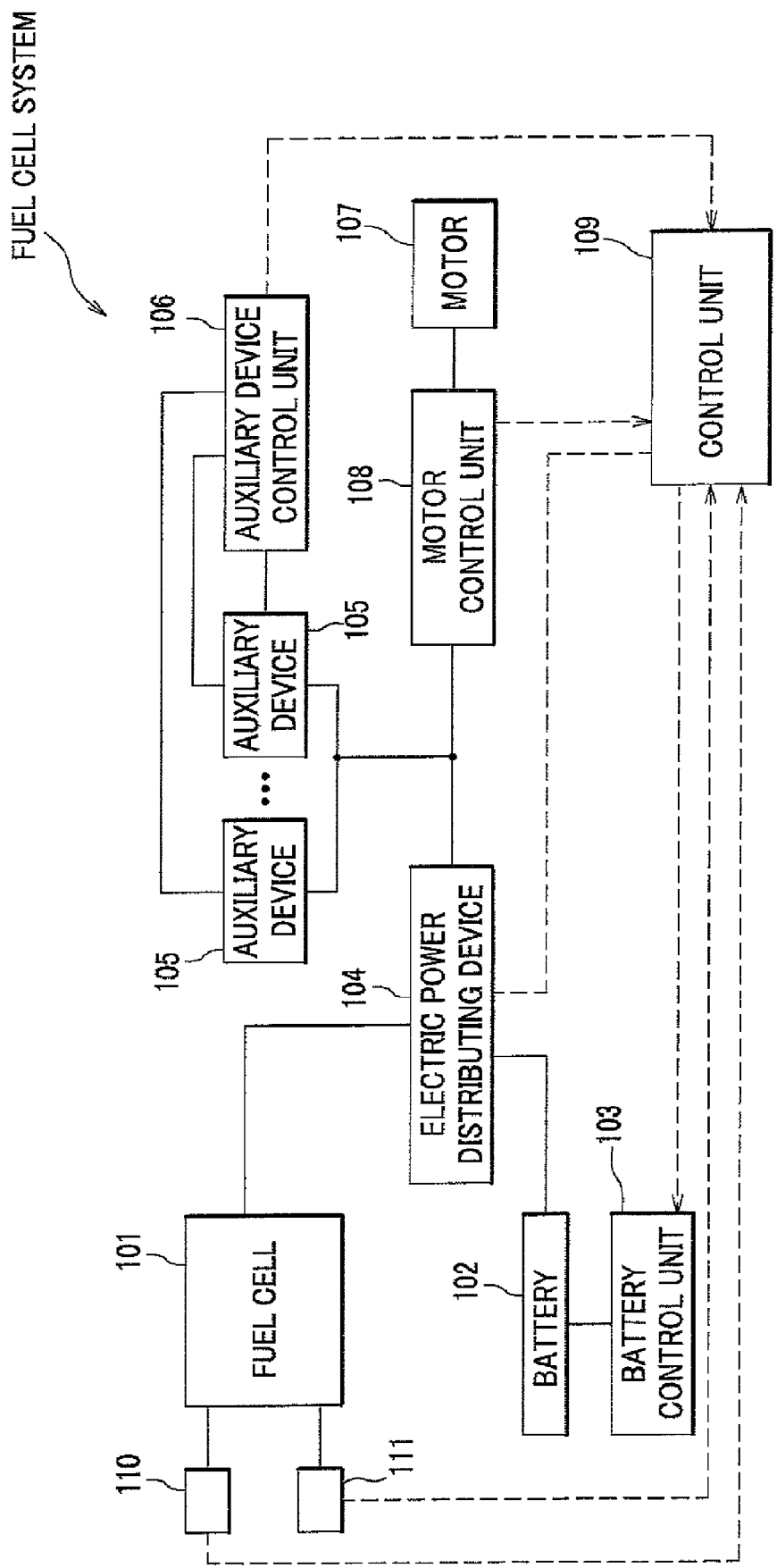
FIG. 1 is a block diagram showing a fuel cell system of a first embodiment.

FIG. 1 shows a fuel cell system of a first embodiment. The fuel cell system (electric power supply system) of the first embodiment is applied, for example, to an electric vehicle, a boat or the like, which operates with a fuel cell provided as a power supply.

As shown in FIG. 1, the fuel cell system (FC (fuel cell) system: hereinafter referred to as the system) includes: a fuel cell (FC) 101; a battery 102 as a chargeable device (electricity storage device); a battery control unit 103; an electric power distributing device 104; a plurality of auxiliary devices 105; an auxiliary device control unit 106; a motor 107 as an electrical load; a motor control unit 108; and a control unit 109.

The battery 102 and the fuel cell 101 are connected in parallel, and also connected to the electric power distributing device 104. The battery control unit 103 is connected to the battery 102. The auxiliary device control unit 106 is connected to the plurality of auxiliary devices 105. The motor control unit 108 is connected to the motor 107. The electric power distributing device 104 is connected to the plurality of auxiliary devices 105 and the motor control unit 108. The electric power distributing device 104 is connected to the fuel cell 101. The control unit 109 is connected to the battery control unit 103, the electric power distributing device 104, the auxiliary device control unit 106, and the motor control unit 108. As described later, the fuel cell 101 is connected to the control unit 109 via a voltage detector 110 and a current detector 111.

The battery 102 is a high-voltage battery providing a storage battery which assembles a plurality of unit cells, such as a Li-ion (Lithium-ion) battery or a NiH (nickel hydrogen) battery.

The fuel cell 101 generates electricity by chemical reaction between a fuel gas and an oxidation gas, provides an electric power for an electrical load and connects with the battery 102 in parallel. The battery 102 can be charged by the fuel cell 101 and supply an electric power to electrical loads. The electric power distributing device 104 distributes the output electric power of the fuel cell 101 and the battery 102 on the basis of a control signal from the control unit 109, thereby supplying an electric power to the electrical loads. The electrical loads include the plurality of auxiliary devices for operating to generate electricity. The motor 107 generates a driving force to drive a vehicle. The control unit 109 controls the operation of the whole fuel cell system.

The fuel cell system further includes the voltage detector 110 and the current detector 111 which are connected to the fuel cell 101. The voltage detector 110 and the current detector 111 are connected to the control unit 109. The voltage detector 110 detects a value of the output voltage of the fuel cell 101 and transmits the voltage value to the control unit 109. The current detector 111 detects a value of the output current of the fuel cell 101 and transmits the current value to the control unit 109.

The control unit 109 collects and stores output electric power values of the fuel cell system for a predetermined time interval and determines a frequency distribution of the output electric power values. In a fuel cell following region where a frequency of the output electric power value in the frequency distribution is equal to or higher than a predetermined value, the control unit 109 determines a sharing ratio of the output electric power so as to increase and decrease the output electric power supplied by the fuel cell 101 in accordance with the output electric power required for the fuel cell system. The control unit 109 changes the output electric power of the fuel cell 101 in accordance with the output electric power required for the fuel cell system. Further, in an assist region where a frequency of the output electric power in the frequency distribution in the predetermined time interval is lower than a predetermined value, the control unit 109 determines the distribution of the output electric power to the fuel cell 101 and the battery 102 so as to increase the distribution of the output electric power supplied by the battery 102.

The output electric power of the fuel cell system (hereinafter referred to as an FC system output or a system output) is equal to the sum of the output electric power consumed by the motor 107 and the auxiliary devices.

The motor 107 in FIG. 1 is used to drive wheels of the vehicle or a screw propeller of a boat. The auxiliary device 105 is exemplified as an air pump which feeds air to the fuel cell 101 to be driven.

The control unit 109 determines the distribution of output electric power to the fuel cell 101 and the battery 102 which supply the output electric power to the motor 107 via the electric power distributing device 104.

The fuel cell system of the first embodiment can suppress the output electric power supplied by an electricity storage battery in the fuel cell following region where the frequency of the output electric power in a predetermined time interval is higher than a predetermined value. Consequently, the fuel cell system can prevent the excess of discharging from the electricity storage battery and efficiently use the output electric power of the electricity storage battery. Therefore, the fuel cell system can decrease the frequency of running out of an assisting operation that the electricity storage battery assists generation of electricity by providing the output electric power for an electrical load, and can improve a fuel consumption of the fuel cell.

Second Embodiment

Figure 2:
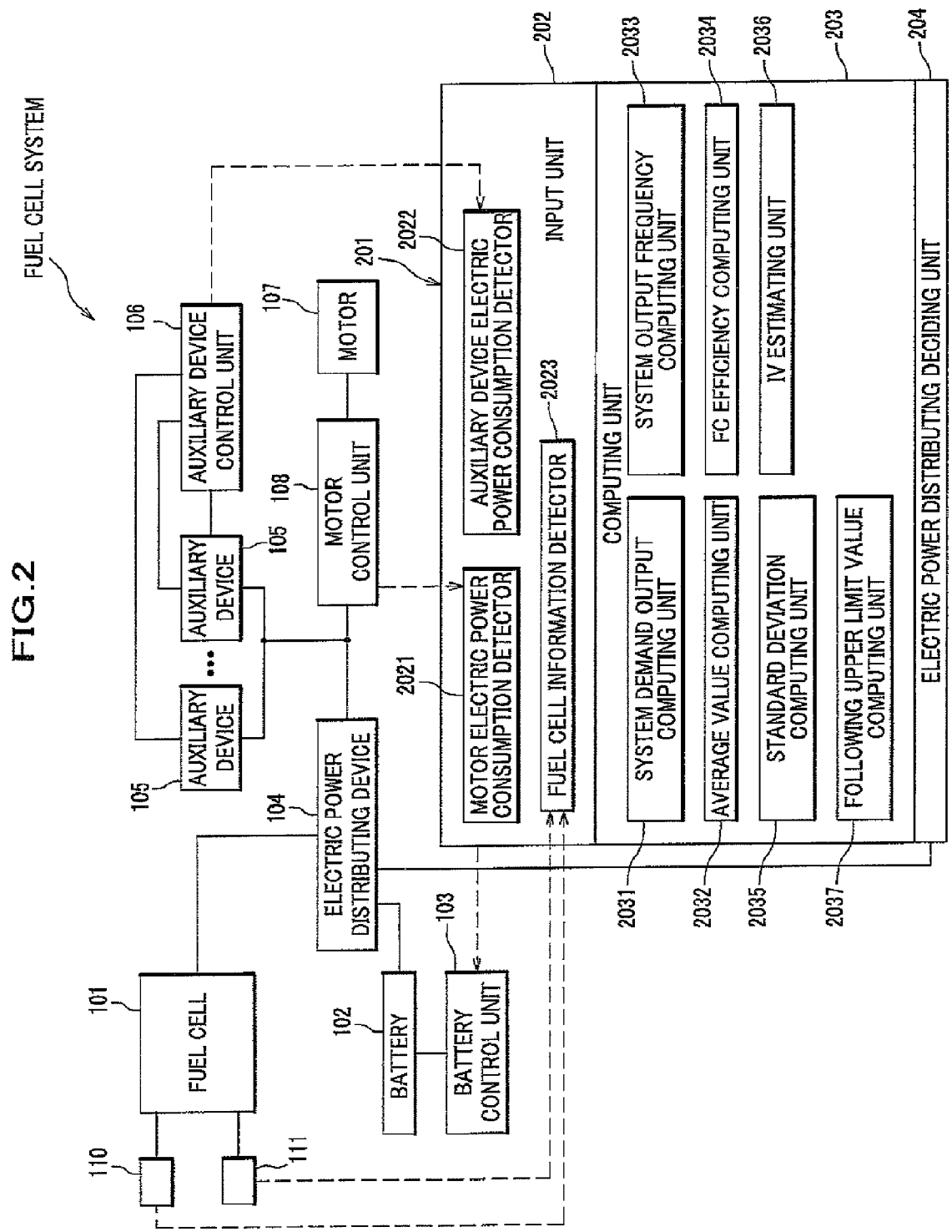
FIG. 2 is a block diagram showing a fuel cell system of a second embodiment.

Next, a second embodiment will be described with reference to drawings in detail. FIG. 2 shows a fuel cell system of the second embodiment. The same parts are designated as the same references of the first embodiment and duplicated descriptions thereof will be omitted.

As shown in FIG. 2, the fuel cell system of the second embodiment includes a control unit 201.

The control unit 201 includes an input unit 202, a computing unit 203 and an electric power distributing deciding unit 204. The input unit includes a motor electric power consumption detector 2021, an auxiliary device electric power consumption detector 2022, and an FC (fuel cell) information detector 2023. The FC information detector 2023 receives signals of a voltage value and a current value of the fuel cell 101.

The computing unit 203 includes a system demand output computing unit 2031, an average value computing unit 2032, a system output frequency computing unit 2033, an FC efficiency computing unit 2034, a standard deviation computing unit 2035, an IV estimating unit 2036, and a following upper limit value computing unit 2037. The electric power distributing deciding unit 204 determines the distribution of the output electric power to the fuel cell 101 and the battery 102, from which the output electric power is transmitted to the electric power distributing device 104, on the basis of a result computed by the computing unit 203.

The system demand output computing unit 2031 computes the output electric power required for the fuel cell system. The average value computing unit 2032 computes an average value of the output electric power of the fuel cell system during a predetermined time interval. The system output frequency computing unit 2033 computes the frequency distribution of the output electric power of the FC system during the predetermined time interval. The FC efficiency computing unit 2034 computes an efficiency of the output electric power (fuel cell output) of the fuel cell 101. The efficiency of the fuel cell output is determined by an equation (F1) as follows;

Efficiency Of Fuel Cell Output=(Output Electric Power Of Fuel Cell−Output Electric Power Of Auxiliary Device)÷Hydrogen Combustion Energy    (F1)

JP2006-196221β discloses how to calculate the hydrogen combustion energy and detailed descriptions will be omitted. The output electric power of the fuel cell is determined by multiplying a voltage value of the fuel cell by a current value of the fuel cell.

The standard deviation computing unit 2035 computes a standard deviation from an average value of the frequency distribution of the output electric power of the FC system. The IV estimating unit 2036 estimates current-voltage characteristics (IV characteristics: characteristics of the generation of electricity) on the basis of the voltage value and the current value of the fuel cell 101. JP2006-196221β discloses how to estimate the current-voltage characteristics and detailed descriptions thereof will be omitted. The following upper limit value computing unit 2037 computes an upper limit value which is changed in accordance with the output electric power required for the fuel cell system, the upper limit value (hereinafter referred to as a following upper limit value) adding the average value determined by the average value computing unit 2032 and a standard deviation value determined by the standard deviation computing unit 2035.

The average value of the output electric power of the FC system may be approximately determined by using a first order lag filter, which can reduce the capacity of a memory. The standard deviation may be approximately determined by using the first order lag filter as well.

Next, the operation of the fuel cell system of the second embodiment will be described with reference to FIG. 2, FIG. 3, and FIG. 4.

Figure 3:
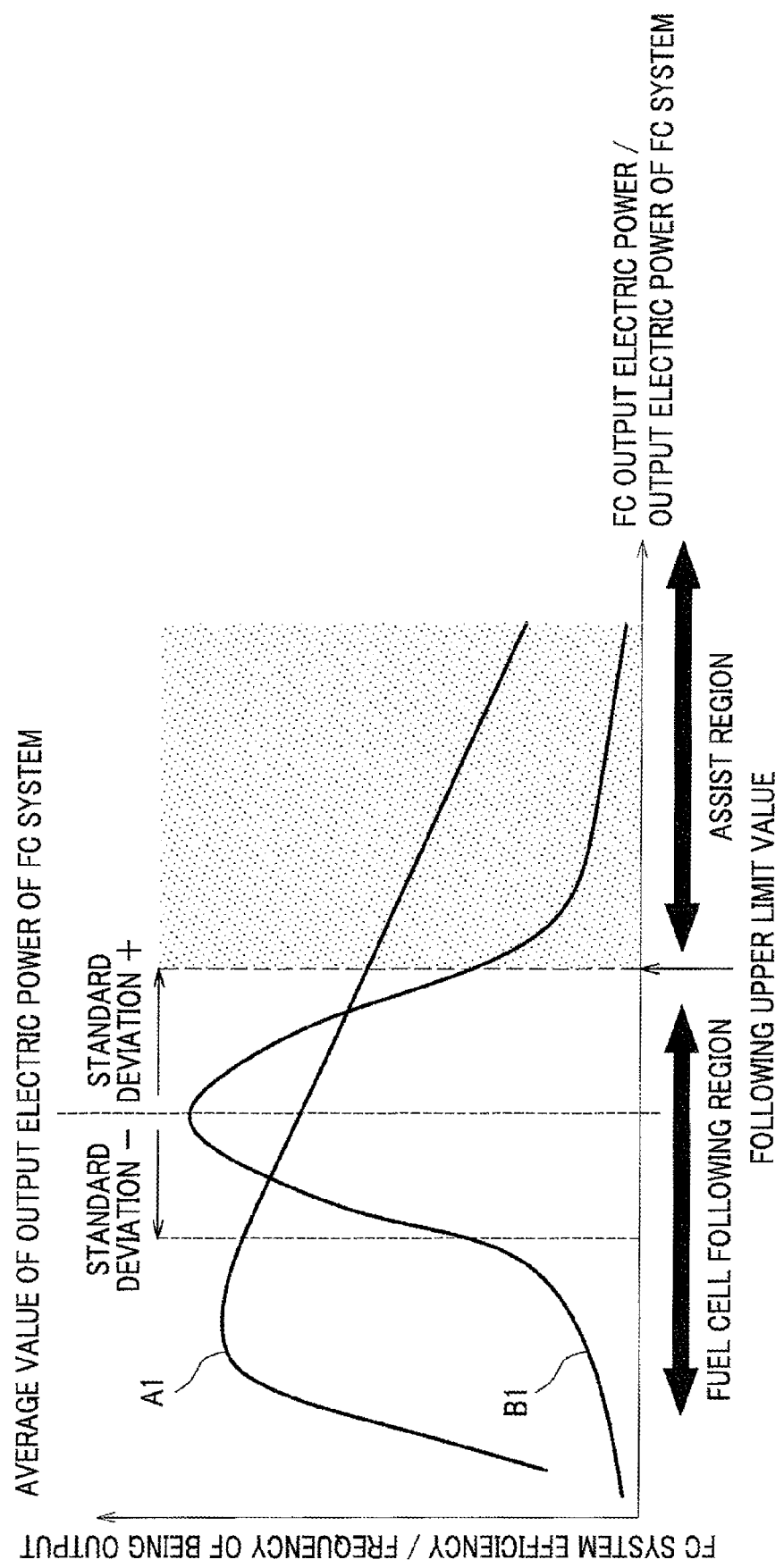
FIG. 3 is a diagram showing a characteristic curve of an efficiency of an output electric power of a fuel cell corresponding to the output electric power of the fuel cell, and a characteristic curve of a frequency of the output electric power of the fuel cell system corresponding to the output electric power of the fuel cell system of the second embodiment.

FIG. 3 shows the operation of the fuel cell system. In FIG. 3, a vertical axis shows the efficiency of the output electric power of the fuel cell and the frequency of the output electric power of the fuel cell system, and a horizontal axis shows the output electric power of the fuel cell (FC output) and the output electric power of the fuel cell system (system output). A characteristic curve A1 shows the efficiency of the output electric power of the fuel cell, which is corresponding to the FC output. A characteristic curve B1 shows a histogram of the electric power consumption of the fuel cell system, which is corresponding to the system output.

Figure 4:
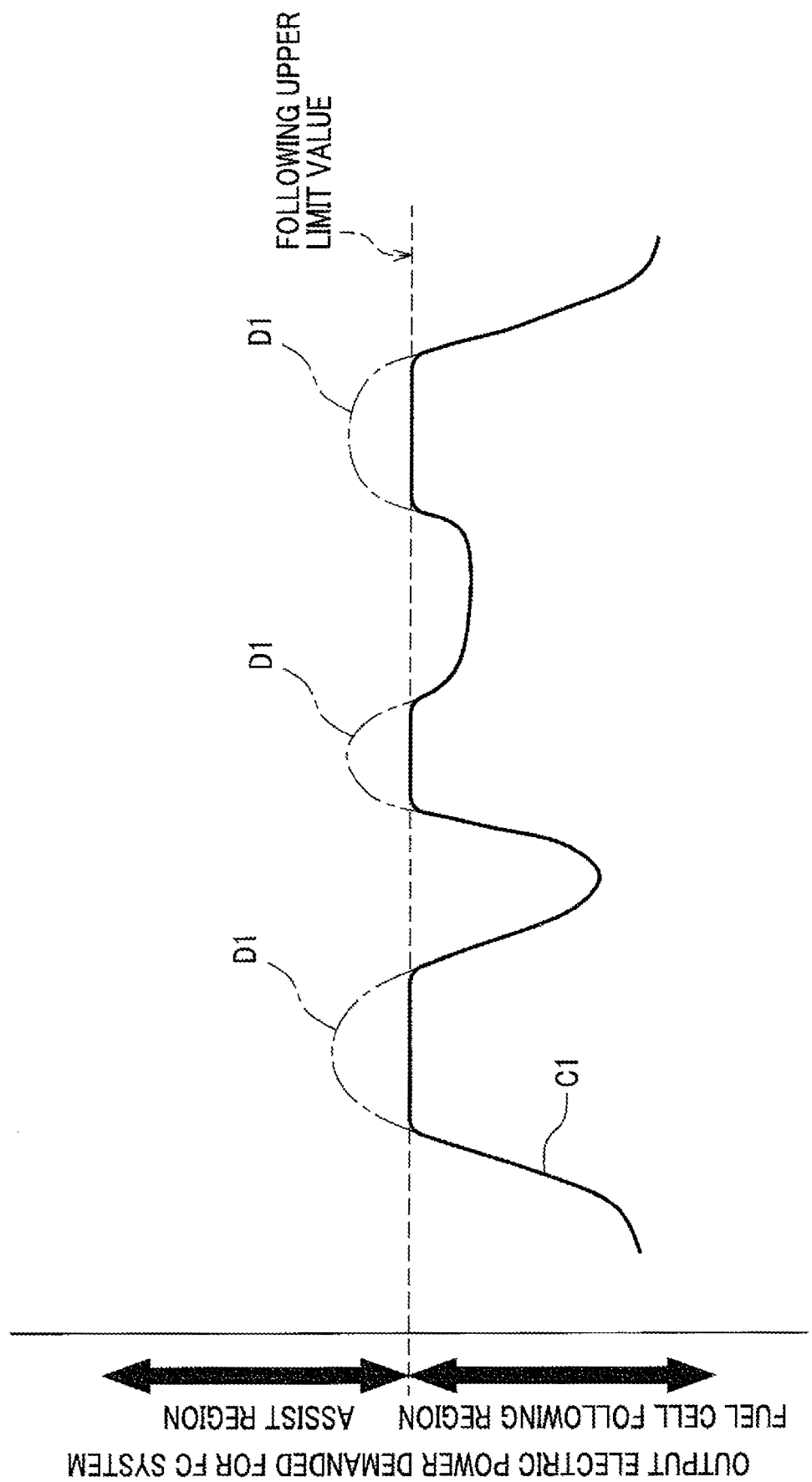
FIG. 4 is a diagram showing an output electric power required for the fuel cell system of the second embodiment in time series.

FIG. 4 shows the output electric power of the fuel cell system in time series. In FIG. 4, a vertical axis shows the output electric power required for the fuel cell system, and a horizontal axis shows time.

As shown in FIG. 3 and FIG. 4, the control unit 201 computes an average value and a standard deviation value of the output electric power of the fuel cell system in a predetermined time interval on the basis of the frequency distribution of the output electric power of the fuel cell system, and computes the following upper limit value by adding the average value and the standard deviation value. When the output electric power required for the fuel cell system is lower than the following upper limit value (fuel cell following region), the control unit 201 determines the distribution of the output electric power to the fuel cell 101 and the battery 102 so as to increase and decrease the output electric power supplied by the fuel cell 101 in accordance with a change of the output electric power required for the fuel cell system. When the output electric power required for the fuel cell system is equal to or higher than the following upper limit value (assist region), the control unit 201 determines the sharing ratio of the output electric power to the fuel cell 101 and the battery 102 so as to increase the distribution of the output electric power supplied by the battery 102. In the assist region, the control unit 201 changes the sharing ratio of the output electric power to the fuel cell 101 and the battery 102 in accordance with the output electric power required for the fuel cell system. Further, the control unit 201 transmits the distribution of the output electric power to the electric power distributing device 104 being controlled.

It is not necessary that the control unit 201 distributes the output electric power so as to equate the output electric power of the fuel cell 101 to the output electric power required for the fuel cell system. The output voltage of the fuel cell can be increased by adding a high-voltage gain.

The electric power distributing device 104 controlled by the control unit 201 of the second embodiment distributes the output electric power of the fuel cell 101 as shown in a solid line C1 in FIG. 4 and the output electric power of the battery 102 as shown in a chain line D1 in FIG. 4.

The fuel cell system of the second embodiment can compute the average value and the standard deviation value on the basis of the frequency distribution of the output electric power of the fuel cell system, and compute the following upper limit value by adding the average value and the standard deviation value, and determine the following upper limit value in accordance with the change of the output electric power of the fuel cell system in time series. Accordingly, the fuel cell system can specify a region where the output electric power of the fuel cell system is frequently used, although the average value and the standard deviation value on the basis of the frequency distribution of the output electric power of the fuel cell system in a predetermined time interval are changed as time goes by.

Figure 5:
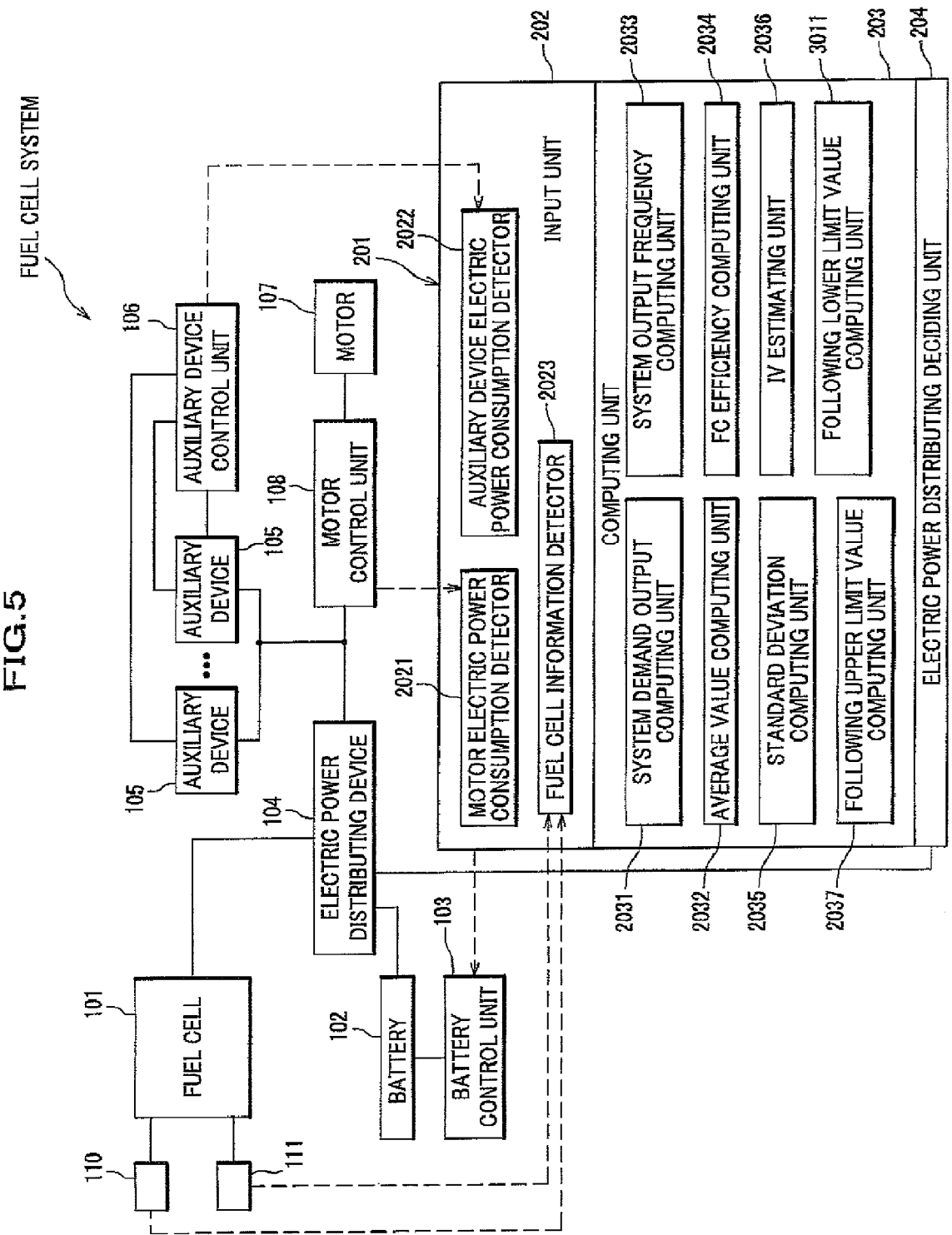
FIG. 5 is a block diagram showing a fuel cell system of a third embodiment.

Next, a third embodiment will be described with reference to drawings in detail. FIG. 5 shows the fuel cell system of the third embodiment. The same parts are designated as the same references of the first and second embodiments and duplicated descriptions thereof will be omitted.

As shown FIG. 5, the fuel cell system of the third embodiment includes a control unit 301 which includes a following lower limit value computing unit 3011.

The following lower limit value computing unit 3011 computes an average value and a standard deviation value on the basis of the frequency distribution of the output electric power of the fuel cell system in a predetermined time interval, and computes a following lower limit value by subtracting the standard deviation value from the average value.

Next, the operation of the fuel cell system of the third embodiment will be described with reference to FIG. 5, FIG. 6 and FIG. 7.

Figure 6:
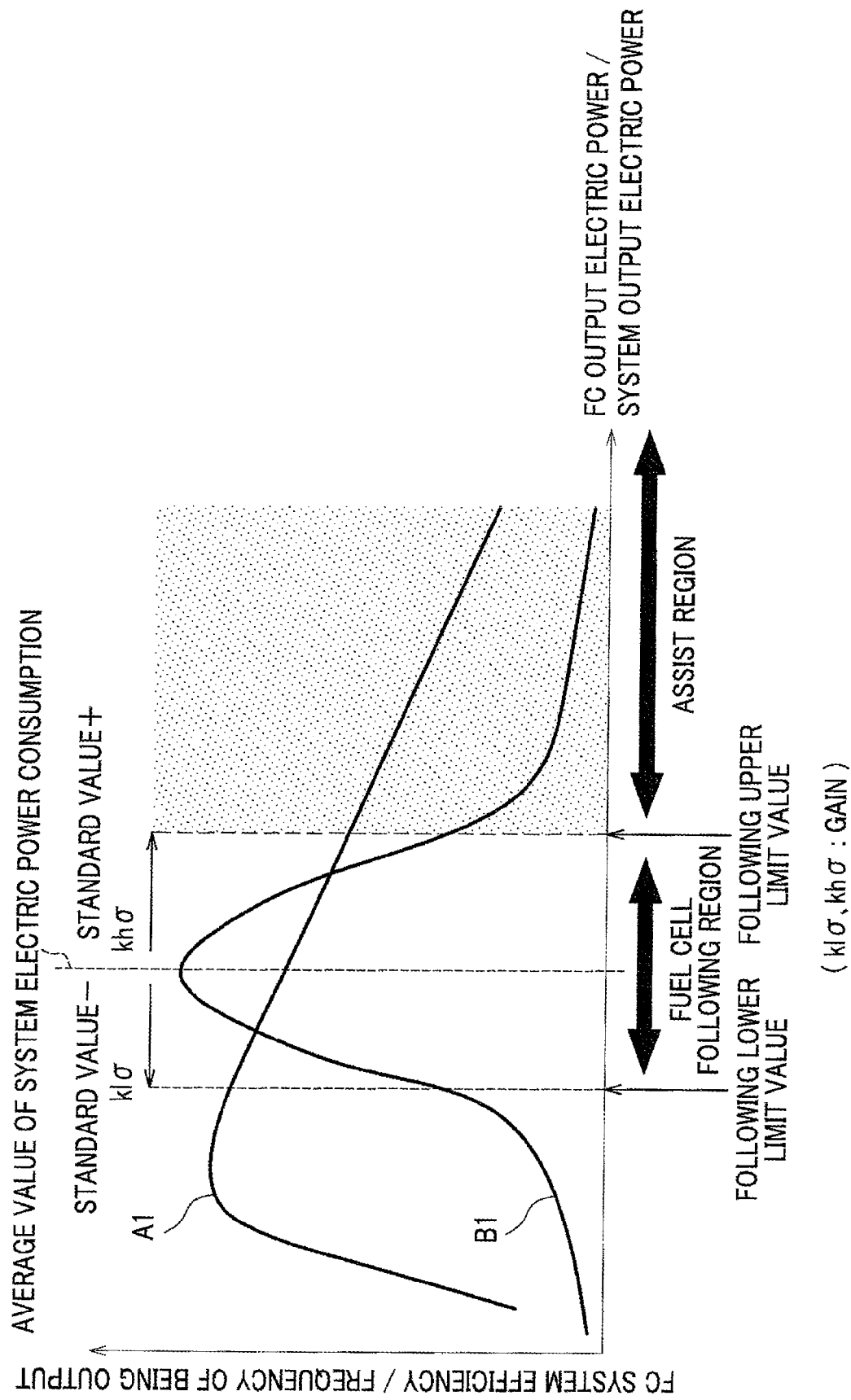
FIG. 6 is a diagram showing a characteristic curve of an efficiency of the output electric power of the fuel cell corresponding to the output electric power of the fuel cell, and a characteristic curve of a frequency of the output electric power of the fuel cell system corresponding to the output electric power of the fuel cell system of the third embodiment.

FIG. 6 shows the operation of the fuel cell system. In FIG. 6, a vertical axis shows an efficiency of the output electric power of the fuel cell and a frequency of the output electric power of the fuel cell system, and a horizontal axis shows the output electric power of the fuel cell (FC output) and the output electric power of the fuel cell system (system output). Characteristic curves A2 and B2 are substantially the same as those of FIG. 3 and descriptions thereof will be omitted.

As shown in FIG. 6, when the output electric power required for the fuel cell system is equal to or higher than the following lower limit value, and is lower than the following upper limit value, the control unit 301 determines the distribution of the output electric power to the fuel cell 101 and the battery 102 so as to increase and decrease the output electric power supplied by the fuel cell 101 in accordance with a change of the output electric power required for the fuel cell system. When the output electric power required for the fuel cell system is equal to or higher than the following upper limit value, and is lower than the following lower limit value (assist region), the control unit 301 determines the distribution of the output electric power to the fuel cell 101 and the battery 102 so as to increase the distribution of the output electric power supplied by the battery 102. Further, the control unit 301 transmits the signal of a distribution value of the output electric power to the electric power distributing device 104 being controlled.

Figure 7:
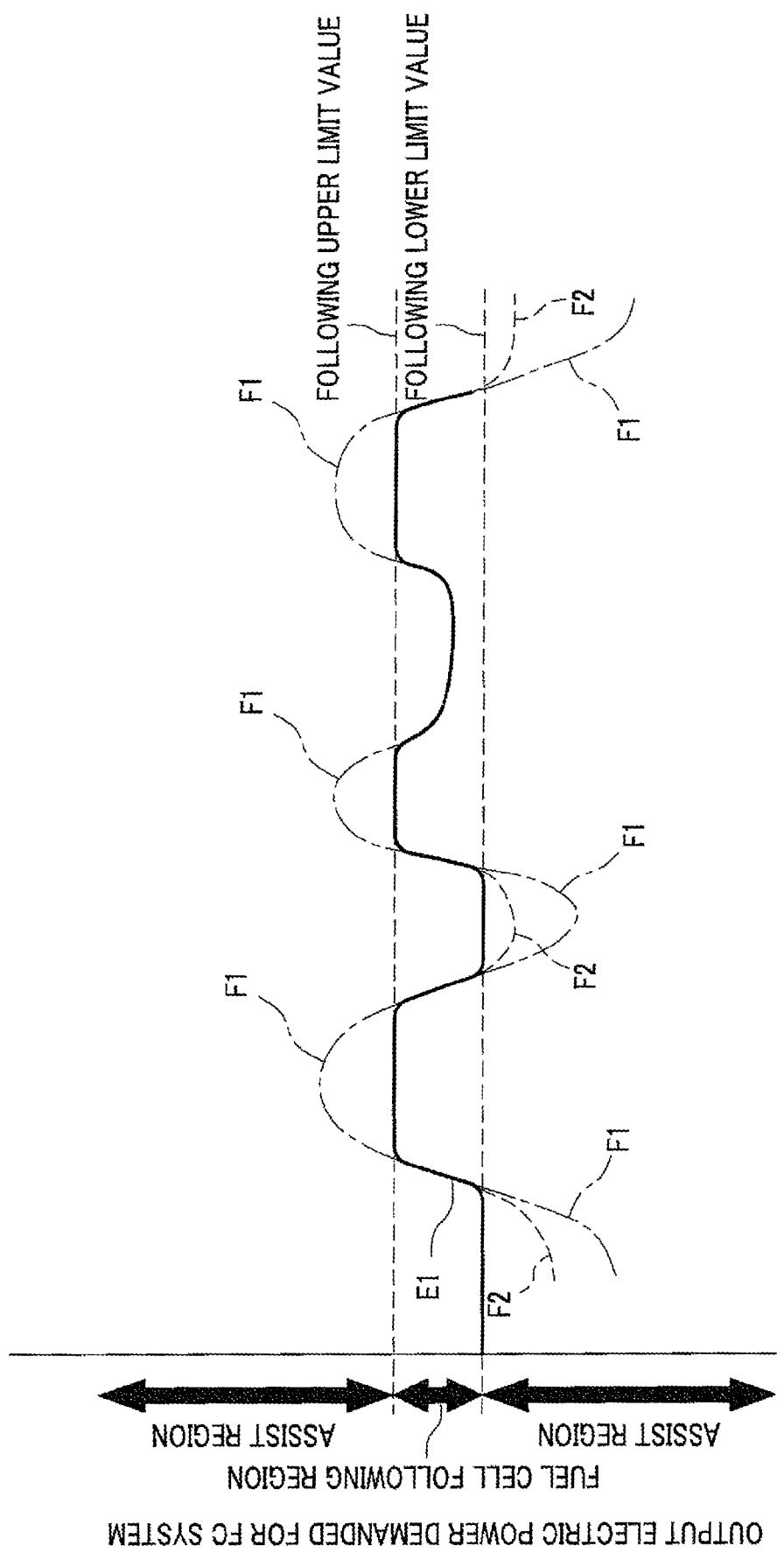
FIG. 7 is a diagram showing an output electric power of the fuel cell system of the third embodiment in time series.

FIG. 7 shows the output electric power values of the fuel cell system in time series. In FIG. 7, a vertical axis shows the output electric power required for the fuel cell system, and a horizontal axis shows time.

The electric power distributing device 104 controlled by the control unit 301 of the third embodiment distributes the output electric power of the fuel cell 101 as shown in a solid line E1 in FIG. 7 and the output electric power of the battery 102 as shown in a chain line F1 in FIG. 7. The control unit 301 controls the output electric power of the FC system in such a manner that the output electric power of the FC system is higher than the following lower limit value (lower assist region in FIG. 7). When the output electric power of the FC system is equal to or lower than the following lower limit value, the control unit 301 can instruct the electric power distributing device 104 to charge the battery 102 with a surplus output electric power of the fuel cell (as shown in a dashed line F2 in FIG. 7).

The fuel cell system of the third embodiment can compute the average value and the standard deviation value on the basis of the frequency distribution of the output electric power of the fuel cell system, and compute the following lower limit value by subtracting the standard deviation value from the average value, and determine the following lower limit value in accordance with a change of the output electric power of the fuel cell system in time series. Accordingly, the fuel cell system can specify a region where the output electric power of the fuel cell system is frequently used, although the average value and the standard deviation value on the basis of the frequency distribution of the output electric power of the fuel cell system in a predetermined time interval are changed as time goes by.

Fourth Embodiment

Figure 8:
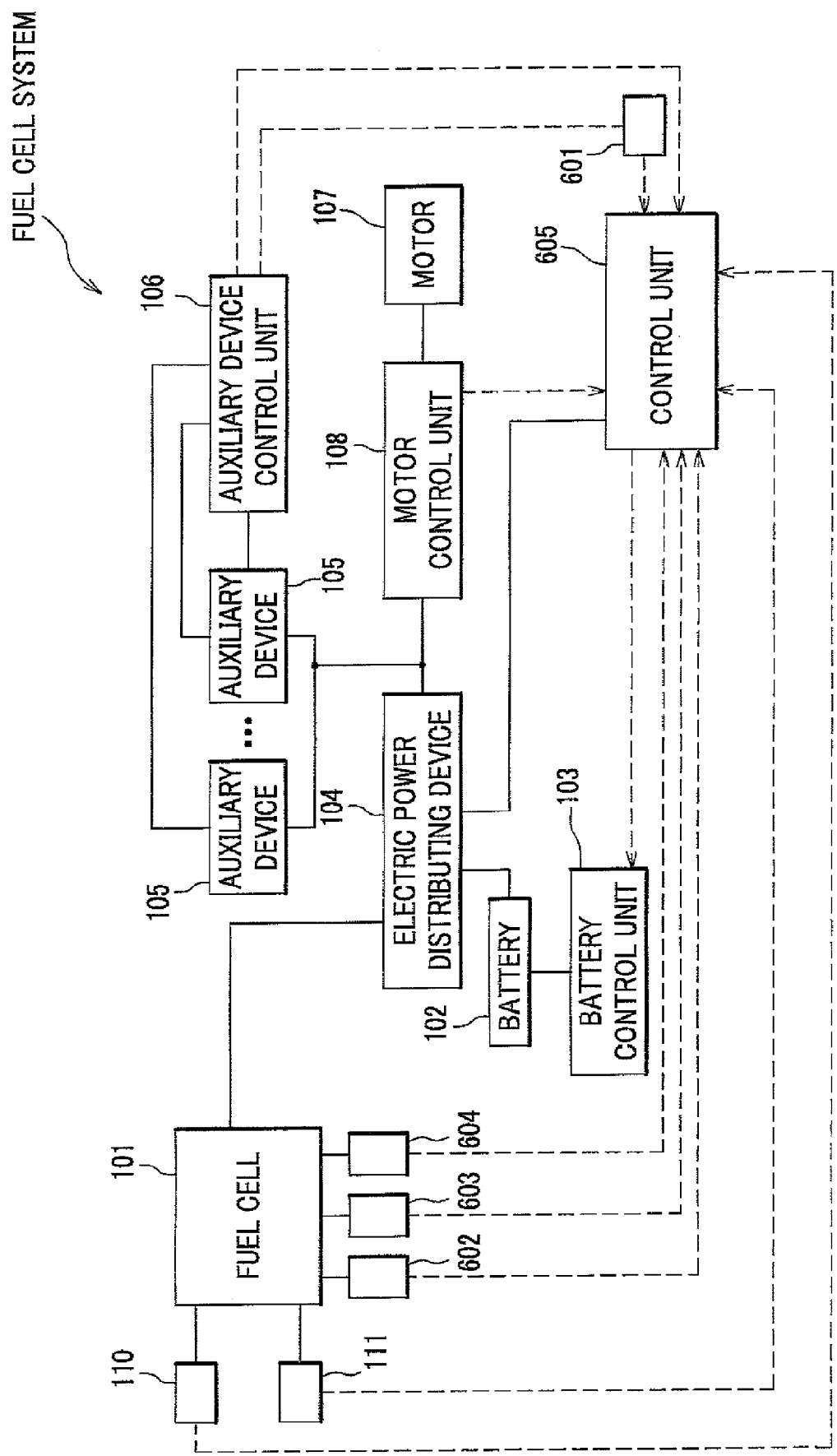
FIG. 8 is a block diagram showing a fuel cell system of the fourth embodiment.

Next, a fourth embodiment of the present invention will be described with reference to drawings in detail. FIG. 8 shows a fuel cell system of the fourth embodiment. The same parts are designated as the same references of the first embodiment and duplicated descriptions thereof will be omitted.

As shown in FIG. 8, the fuel cell system of the fourth embodiment includes an auxiliary device consuming electric power detector 601, a temperature detector 602, a pressure detector 603, a humidity detector 604, a control unit 605, and the same parts except the control unit 109 of the first embodiment.

The auxiliary device consuming electric power detector 601 connects to the auxiliary device control unit 106, detects an electric power consumed by the auxiliary devices 105 (FIG. 1) of the fuel cell system, and transmits the signal of the electric power value to the control unit 605. The temperature detector 602 detects an internal temperature value of the fuel cell 101 and transmits the signal of the internal temperature value to the control unit 605. The pressure detector 603 detects an internal pressure value of the fuel cell 101 and transmits the signal of the internal pressure value to the control unit 605. The humidity detector 604 detects an internal humidity value of the fuel cell 101 and transmits the signal of the internal humidity value to the control unit 605.

The control unit determines the following upper limit value as described in the first and second embodiments, computes an efficiency of the output electric power of the fuel cell when the fuel cell system periodically supplies an output electric power to the motor 107, and determines the following lower limit value which is a value of the output electric power of the fuel cell 101 to maximize the efficiency of the output electric power of the fuel cell. When the output electric power of the fuel cell 101 is equal to or higher than the following lower limit value, and the output electric power required for the fuel cell system is lower than the following upper limit value, the control unit 605 determines the distribution of the output electric power to the fuel cell 101 and the battery 102 so as to increase and decrease the output electric power supplied by the fuel cell 101 in accordance with a change of the output electric power required for the fuel cell system.

In this case, the control unit 605 computes the efficiency of the output electric power of the fuel cell on the basis of current-voltage characteristics of the fuel cell and the electric power consumption of the auxiliary devices.

Figure 9:
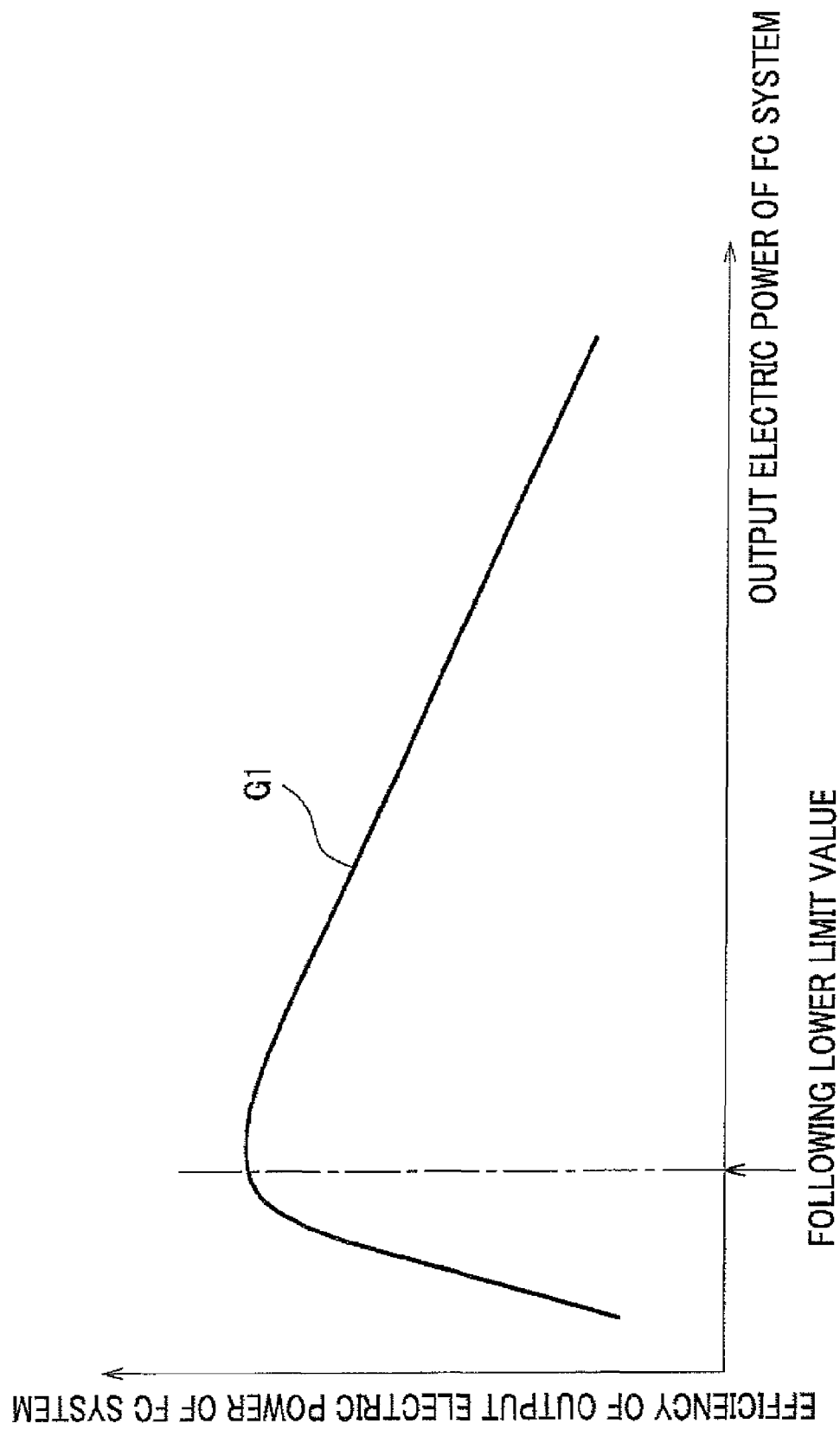
FIG. 9 is a diagram showing a characteristic curve of an efficiency of an output electric power of the fuel cell corresponding to the output electric power required for the fuel cell.

FIG. 9 shows an operation of the fuel cell of the fourth embodiment. In FIG. 9, a vertical axis shows the efficiency of the output electric power of the fuel cell, and a horizontal axis shows the output electric power of the fuel cell (FC output). A characteristic curve G1 shows a change in the efficiency of the output electric power of the fuel cell.

The control unit 605 determines the following upper limit value as described in the first and second embodiments, determines the following lower limit value which is a value of the output electric power of the fuel cell 101 to maximize the efficiency of the output electric power of the fuel cell and shown as an FC output value when the efficiency of the FC output is the highest on the characteristic curve G1 of FIG. 9. When the output electric power of the fuel cell 101 is equal to or higher than the following lower limit value, the output electric power required for the fuel cell system is lower than the following upper limit value, the control unit 605 determines the distribution of the output electric power to the fuel cell 101 and the battery 102 so as to increase and decrease the output electric power supplied by the fuel cell 101 in accordance with a change of the output electric power required for the fuel cell system.

The control unit 605 may as well compute the efficiency of the output electric power of the fuel cell on the basis of any of a temperature of the temperature detector 602, a pressure of the pressure detector 603, or a humidity of the humidity detector 604. It is because the efficiency of the output electric power of the fuel cell is changed with any of the temperature of the temperature detector 602, the pressure of the pressure detector 603, or the humidity of the humidity detector 604, and accordingly, the following lower limit value is changed.

Figure 10:
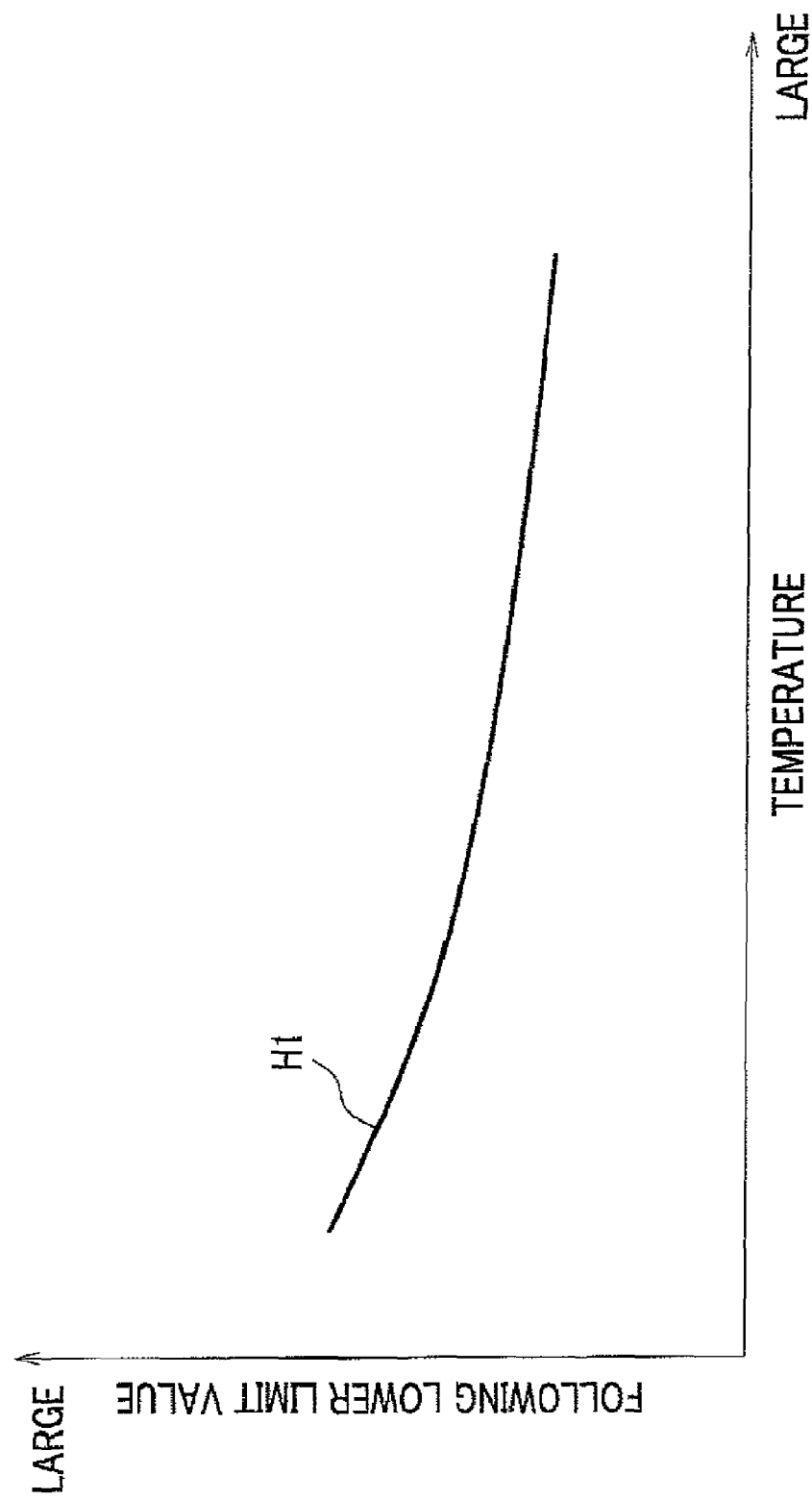
FIG. 10 is a diagram showing a characteristic curve of a temperature corresponding to a following lower limit value.
Figure 11:
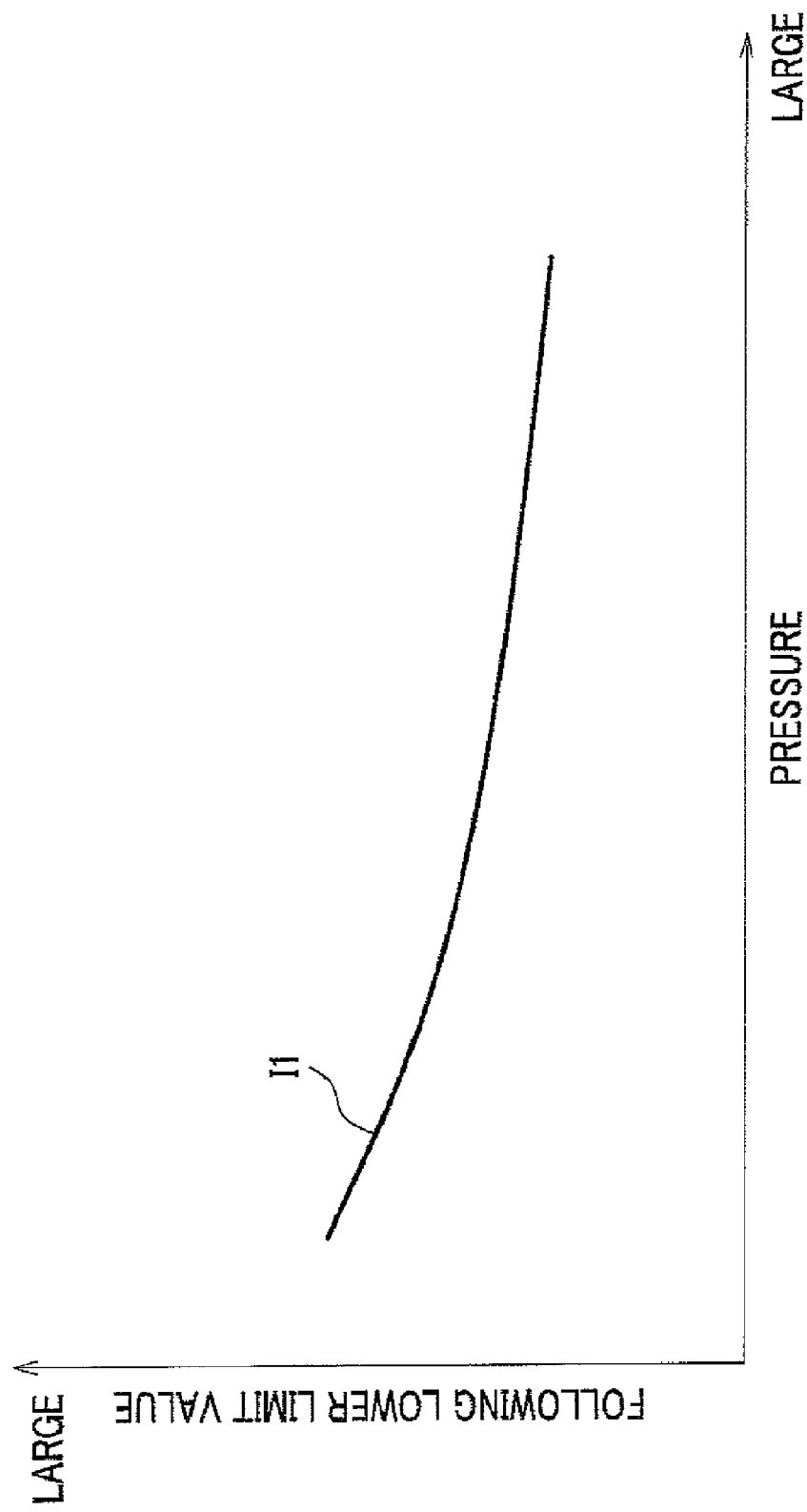
FIG. 11 is a diagram showing a characteristic curve of a pressure corresponding to the following lower limit value.
Figure 12:
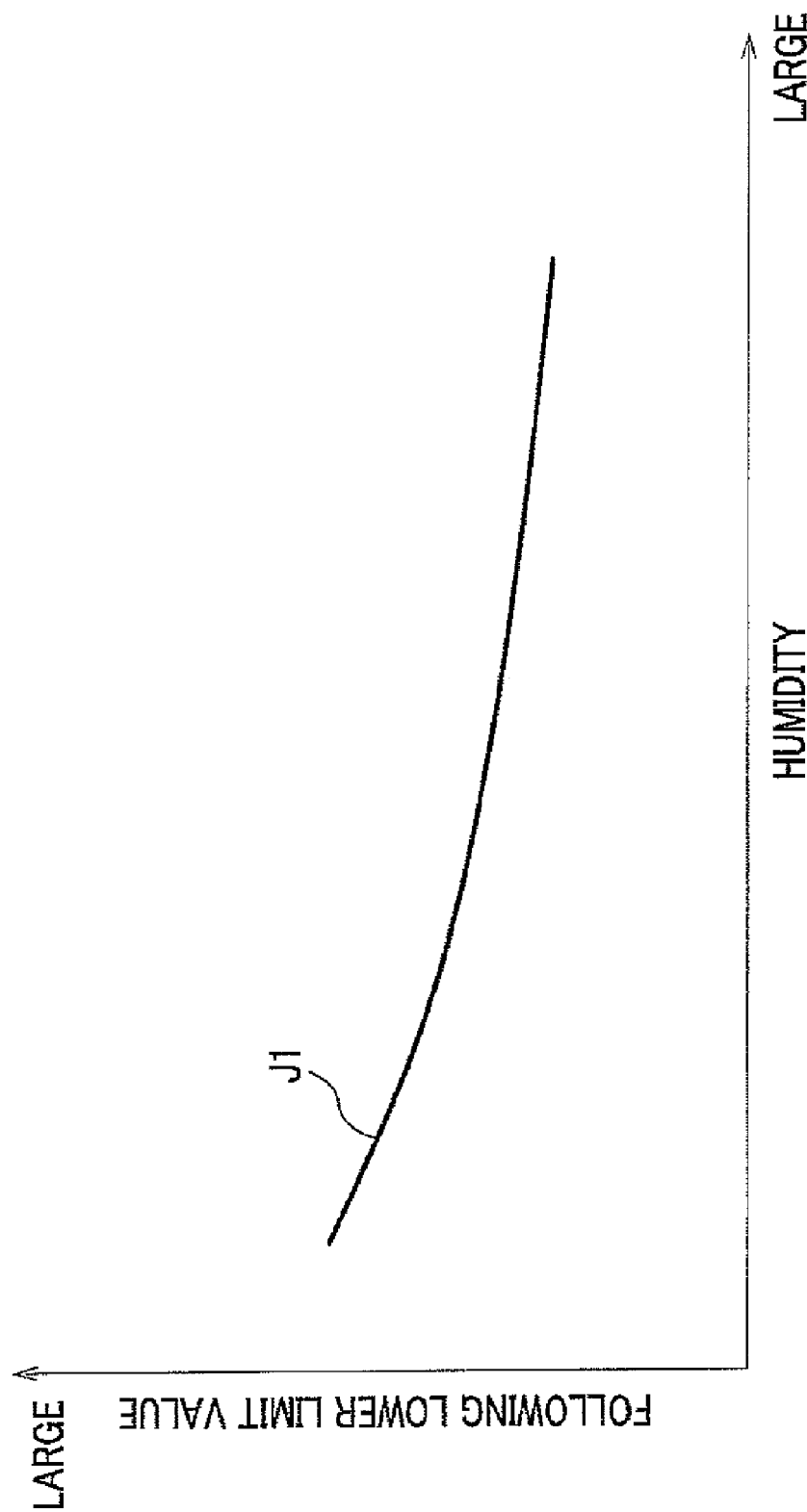
FIG. 12 is a diagram showing a characteristic curve of a humidity corresponding to the following lower limit value.

As shown in FIG. 10 having a characteristic curve H1, the following lower limit value is changed on the basis of the temperature of the temperature detector 602. As shown in FIG. 11 having a characteristic curve I1, the following lower limit value is changed on the basis of the pressure of the pressure detector 603. As shown in FIG. 12 having a characteristic curve J1, the following lower limit value is changed on the basis of the humidity of the humidity detector 604.

The control unit 605 may as well instruct the fuel cell 101 to stop generation of electricity when the output electric power required for the fuel cell 101 is lower than the following lower limit value.

Figure 13:
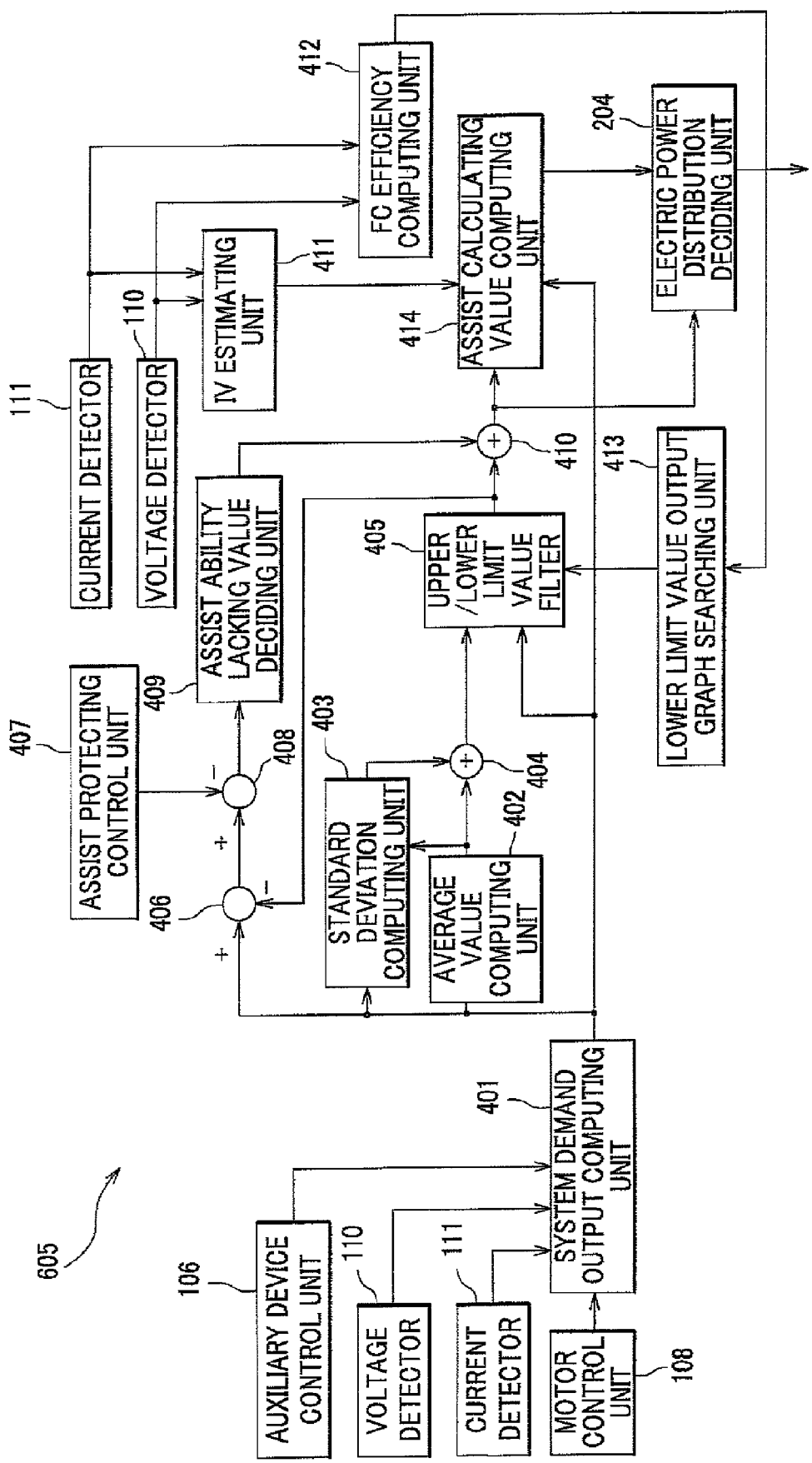
FIG. 13 is a block diagram showing a control unit of the fourth embodiment.

Next, the detail of the control unit 605 of the fourth embodiment will be described with reference to FIG. 13. FIG. 13 shows the control unit 605 of the fourth embodiment of the fuel cell system.

The control unit 605 includes; a system demand output computing unit 401; an average value computing unit 402; a standard deviation computing unit 403; adders 404 and 410; an upper/lower limit value filter 405; subtractors 406 and 408; an assist protecting control unit 407; an assist ability lacking value deciding unit 409; an IV estimating unit 411; a lower limit value output graph searching unit 413; an assist calculating value computing unit 414; and an electric power distribution deciding unit 204. Functions of the units 401 to 414 will be described later with reference to FIG. 14.

Figure 14:
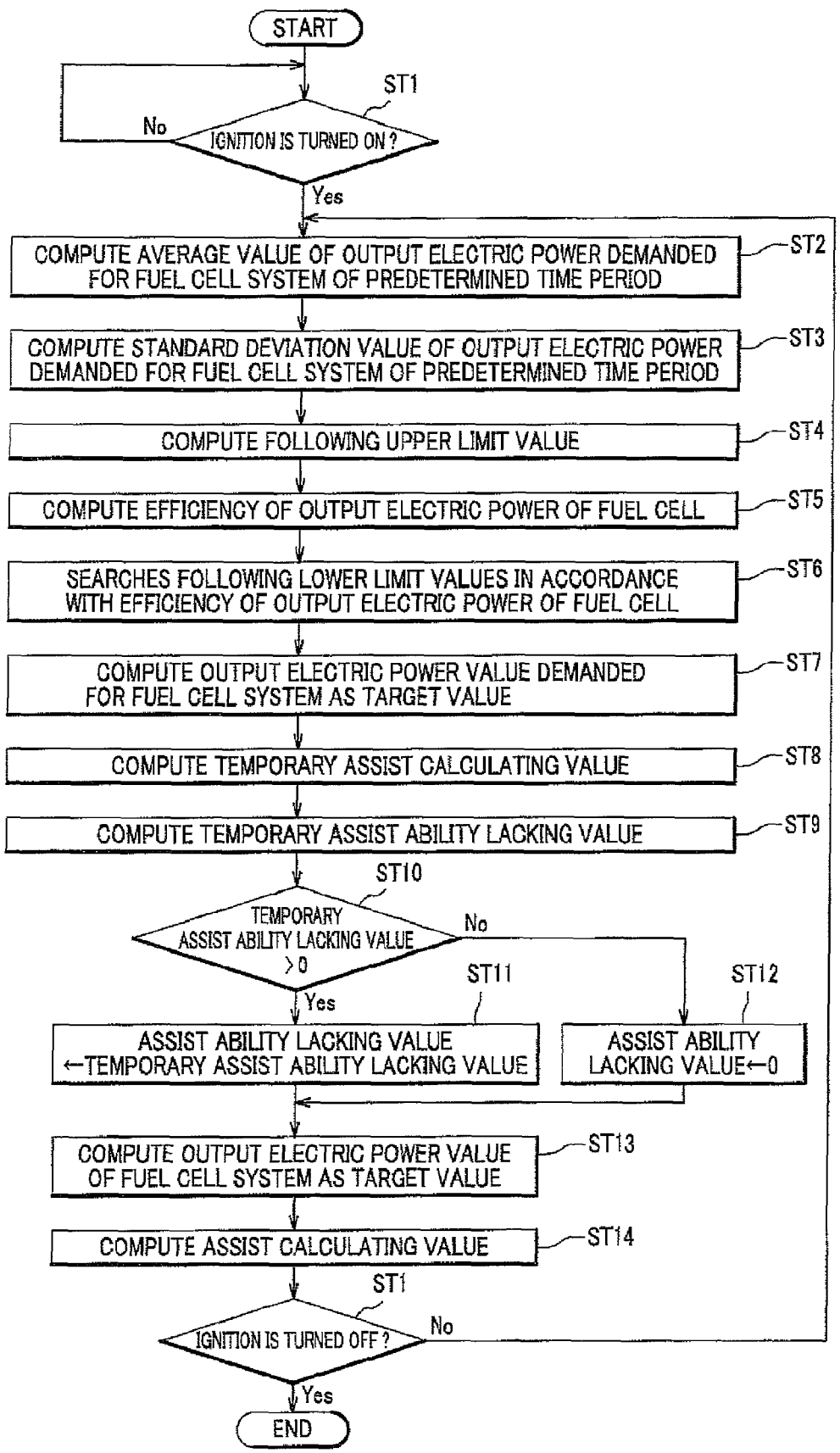
FIG. 14 is a flowchart showing an operation of the fuel cell system of the fourth embodiment.

Next, an operation of the control unit 605 of the fourth embodiment of the fuel cell system will be described with reference to FIG. 13 and FIG. 14 in detail. FIG. 14 is a flowchart showing the operation of the control unit 605 of the fourth embodiment of the fuel cell system.

As shown in FIG. 14, in a step ST1, the control unit 605 determines whether or not an ignition is turned on. When the ignition is not turned on, processing returns to the step ST1 (step 1, No).

In the step ST1, when the ignition is turned on (step ST2, Yes), the system demand output computing unit 401 receives a signal of an electric power value of the auxiliary device estimated by the auxiliary device control unit 106 and a signal of an electric power value of the motor 107 estimated by the motor control unit 108, and computes an output electric power value required for the fuel cell system. The system demand output computing unit 401 stores the output electric power value required for the fuel cell system in a memory not shown. The system demand output computing unit 401 computes an output electric power value of the fuel cell 101 (FC output) on the basis of values of the voltage detector 110, the current detector 111 and the auxiliary device consuming electric power detector 601, and transmits the signal of the output electric power value of the fuel cell 101 to the upper/lower limit value filter 405. After a predetermined time interval, the average value computing unit 402 and the standard deviation computing unit 403 receive the signal of the output electric power value required for the fuel cell system of a predetermined time period from the memory not shown. Further, the average value computing unit 402 receives the signal of a present output electric power value required for the fuel cell system from the system demand output computing unit 401, uses the output electric power value required for the fuel cell system of the predetermined time period from the memory not shown, and computes an average value of the output electric power required for the fuel cell system (demanded system output power) of the predetermined time period (step ST2). Upon computing the average value, the average value computing unit 402 stores the present output electric power value required for the fuel cell system in the memory not shown.

Next, in a step ST3, upon receiving the signal of the present output electric power value required for the fuel cell system from the system demand output computing unit 401, the standard deviation computing unit 403 uses the output electric power value required for the fuel cell system of the predetermined time period from the memory not shown, and computes a standard deviation value of the output electric power required for the fuel cell system (demanded system output power) of the predetermined time period. Subsequently, in a step ST4, the adder 404 (corresponding to the following upper limit value computing unit 2037 in FIG. 2) computes a following upper limit value which adds the average value computed by the average value computing unit 402 and the standard deviation value computed by the standard deviation computing unit 403.

In a step ST5, an FC efficiency computing unit 412 computes an efficiency of the output electric power of the fuel cell 101 on the basis of a current value of the current detector 111 and a voltage value of the voltage detector 110. In a step ST6, the lower limit value output graph searching unit 413 searches following lower limit values in accordance with the efficiency of the output electric power of the fuel cell 101, computed by the FC efficiency computing unit 412, in graphs of FIG. 9 to FIG. 12.

In a step ST7, the upper/lower limit value filter 405 receives the signal of the output electric power value required for the fuel cell system, and transmitted by the system demand output computing unit 401 as a target value for generating electricity. The upper/lower limit value filter 405 filters the output electric power value required for the fuel cell system, which is the target value, by cutting off above the following upper limit value of the adder 404 and below the following lower limit value of the lower limit value output graph searching unit 413, and computes a temporary output electric power value of the fuel cell system. The step ST7 will be described later with reference to FIG. 15.

In a step ST8, the subtractor 406 computes a temporary assist calculating value by subtracting the temporary output electric power value of the fuel cell system computed by the upper/lower limit value filter 405 from the output electric power value required for the fuel cell system, transmitted by the system demand output computing unit 401. In a step ST9, the subtractor 408 computes a temporary assist ability lacking value by subtracting an assist limit value of the assist protecting control unit 407 from the temporary assist calculating value of the subtractor 406.

In a step ST10, upon receiving the signal of the temporary assist ability lacking value of the subtractor 408, the assist ability lacking value deciding unit 409 determines whether or not the temporary assist ability lacking value is larger than zero. When the temporary assist ability lacking value is larger than zero (step ST10, Yes), the assist ability lacking value deciding unit 409 takes the temporary assist ability lacking value for an assist ability lacking value (step ST11). Processing proceeds to a step ST13. When the temporary assist ability lacking value is lower than zero (step ST10, No), the assist ability lacking value deciding unit 409 takes the temporary assist ability lacking value for zero (step ST12). Processing proceeds to the step ST13.

In the step ST13, the adder 410 compute an estimated output electric power value required for the fuel cell system by adding the temporary output electric power value of the fuel cell system of the upper/lower limit value filter 405 and the assist ability lacking value of the assist ability lacking value deciding unit 409, and transmits the signal of the estimated output electric power value to the assist calculating value computing unit 414. In a step ST14, the assist calculating value computing unit 414 computes an assist calculating value by subtracting the estimated output electric power value of the adder 410 from the output electric power value required for the fuel cell system, which is transmitted by the system demand output computing unit 401, and transmits the signal of the assist calculating value to the electric power distributing deciding unit 204. Subsequently, the electric power distributing deciding unit 204 determines the distribution of the output electric power supplied to the motor 107 to the fuel cell 101 and the battery 102 on the basis of the estimated output electric power value required for the fuel cell system and the assist calculating value.

In a step ST15, the control unit 301 determines whether or not the ignition is turned off. When the ignition is turned off (step ST15, Yes), the control unit 301 stops the operation. When the ignition is not turned off (step ST15, No), processing returns to the step ST2.

In the flowchart of FIG. 14, when the following lower limit value is computed by subtracting the standard deviation value from the average value of the output electric power required for the fuel cell system, and the estimated output electric power required for the fuel cell system is computed by cutting off below the following lower limit value, the step proceeds as the same steps where the control unit 301 controls in the third embodiment. The following lower limit value computed based on the average value and the standard deviation value may as well be corrected in searching the graphs in the step ST16.

Figure 15:
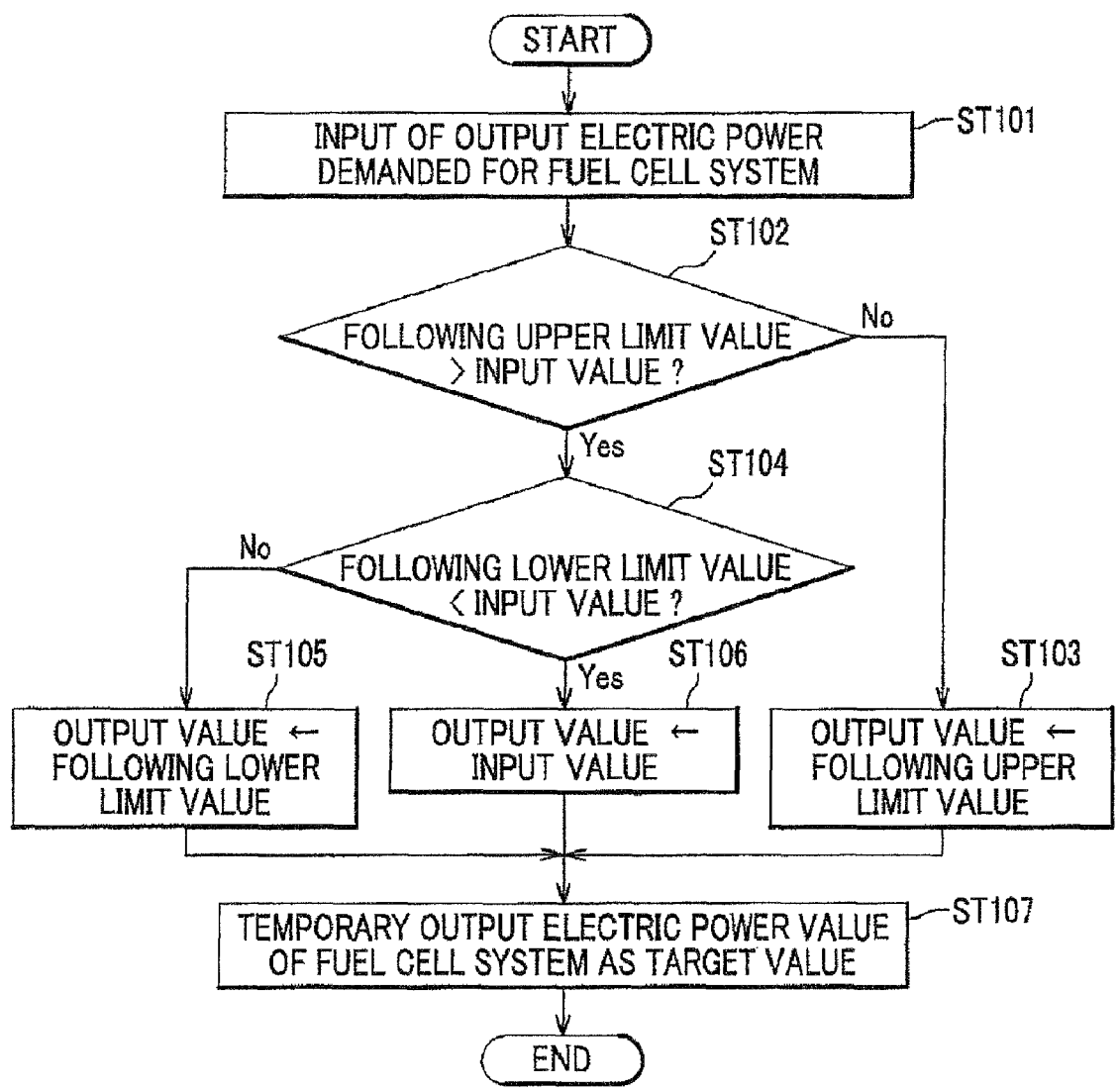
FIG. 15 is a flowchart showing an operation of an upper/lower limit value filter of the control unit of the fourth embodiment.

Next, an operation of the upper/lower limit value filter 405 of the fourth embodiment will be described with reference to FIG. 13 and FIG. 15 in detail. FIG. 15 shows a flowchart of the operation of the upper/lower limit value filter 405.

First, the upper/lower limit value filter 405 receives the output electric power value required for the fuel cell system (step ST101).

Subsequently, the upper/lower limit value filter 405 compares the output electric power value required for the fuel cell system (input value), which is transmitted by the system demand output computing unit 401, with the following upper limit value, and determines whether or not the output electric power value required for the fuel cell system (input value) is lower than the following upper limit value (step ST102).

In the step ST102, when the output electric power value required for the fuel cell system (input value) is equal to or higher than the following upper limit value (step ST102, No), the upper/lower limit value filter 405 outputs the following upper limit value (step ST103).

In the step ST102, when the output electric power value required for the fuel cell system (input value) is lower than the following upper limit value (step ST102, Yes), the upper/lower limit value filter 405 compares the output electric power value required for the fuel cell system (input value), which is transmitted by the system demand output computing unit 401, with the following lower limit value, and determines whether or not the output electric power value required for the fuel cell system (input value) is larger than the following lower limit value (step ST104).

In the step ST104, when the output electric power value required for the fuel cell system (input value) is lower than the following lower limit value (step ST104, No), the upper/lower limit value filter 405 outputs the following lower limit value (step ST105).

In the step ST104, when the output electric power value required for the fuel cell system (input value) is larger than the following upper limit value (step ST104, Yes), the upper/lower limit value filter 405 outputs the output electric power value required for the fuel cell system (input value) (step ST106).

The upper/lower limit value filter 405 transmits the signals of the output values of step ST103, ST105, and ST106 as a temporary output electric power value of the fuel cell system (step ST107).

The fuel cell system of the fourth embodiment can efficiently generate the electricity of the fuel cell 101 by setting a lower limit value of generating the electricity of the fuel cell in accordance with a change of the efficiency of the output electric power of the fuel cell in operation.

The fuel cell system can compute the efficiency of the output electric power of the fuel cell in accordance with a charging state of the fuel cell 101 on the basis of the current-voltage characteristics of the fuel cell 101, the electric power consumption of auxiliary devices, the temperature, the pressure, or the humidity of the fuel cell 101.

Further, the fuel cell system can efficiently use the energy of the fuel cell 101 because the system stops generating the electricity of the fuel cell when the output electric power of the fuel cell 101 is lower than the following lower limit value.

Fifth Embodiment

Figure 16:
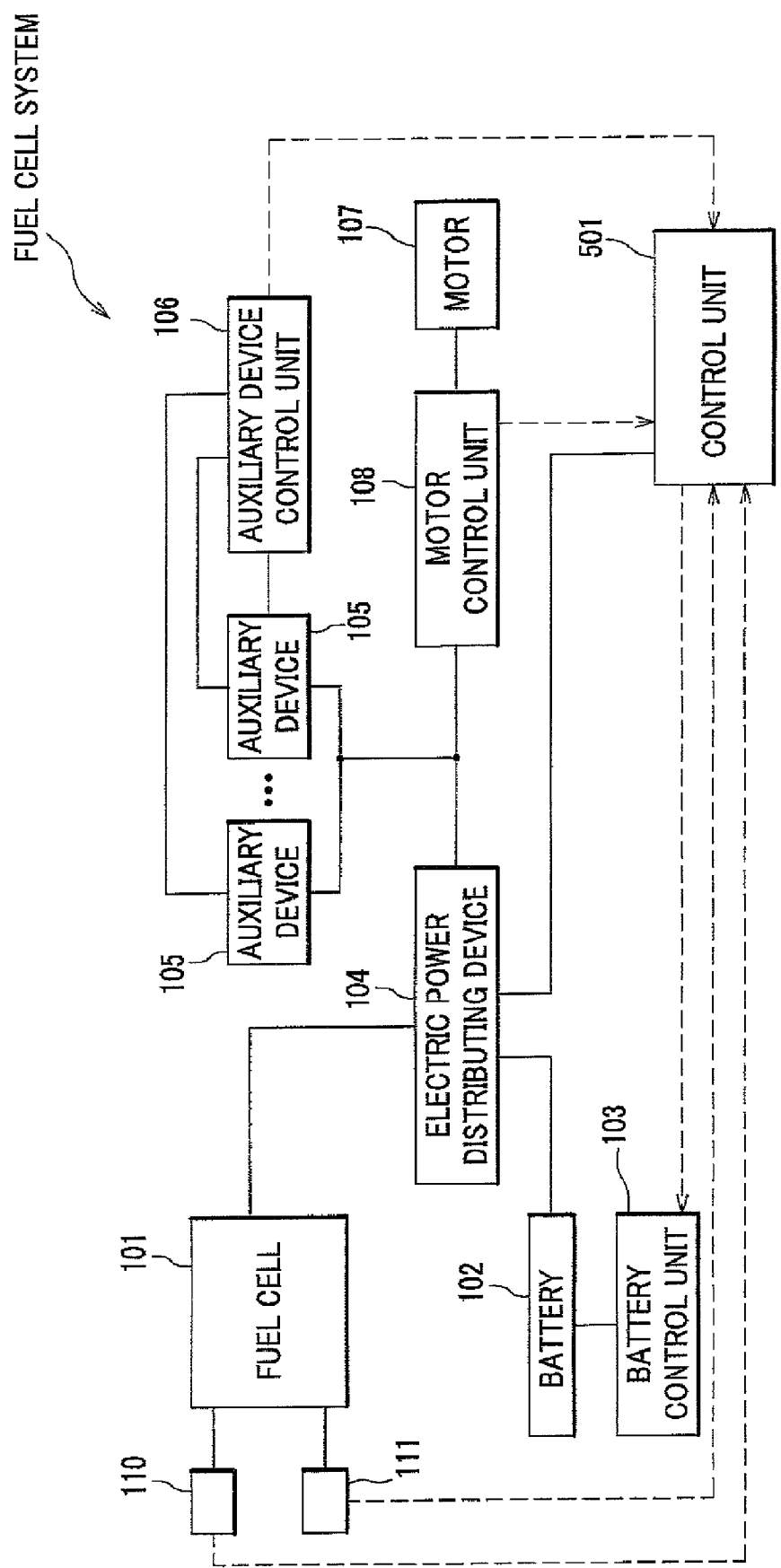
FIG. 16 is a block diagram showing a fuel cell system of a fifth embodiment.
Figure 17:
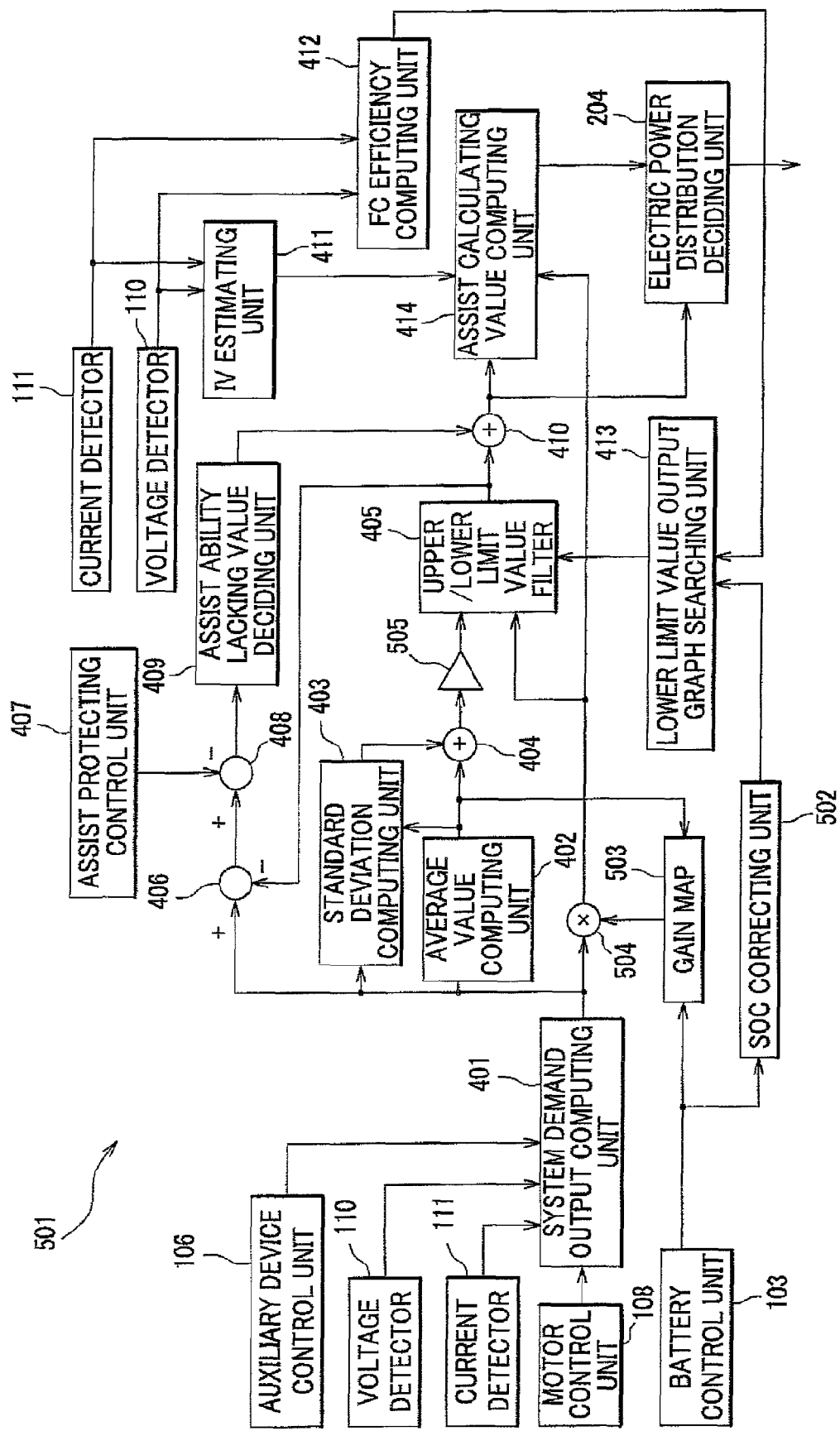
FIG. 17 is a block diagram showing a control unit of the fifth embodiment.

Next, a fifth embodiment will be described with a reference FIG. 16 and FIG. 17 in detail. FIG. 16 shows a fuel cell system of the fifth embodiment. FIG. 17 shows a control unit of the fuel cell system of the fifth embodiment. The same parts are designated as the same references of the third embodiment and duplicated descriptions thereof will be omitted.

As shown in FIG. 16, the fuel cell system of the fifth embodiment includes a control unit 501.

A gain map 503 computes a predetermined gain value on the basis of an average value of the average value computing unit 402 and an SOC value (state of charge) of the battery control 103, and transmits the predetermined gain value to an adder 504. The adder 504 adds the predetermined gain value to the output electric value required for the fuel cell system, transmitted by the system demand output computing unit 401, generates a target value of generating electricity of the fuel cell 101, and transmits the signal of the target value to the upper/lower limit value filter 405 and the assist calculating value computing unit 414. A gain buffer 505 adds a predetermined gain value to the following upper limit value of the adder 404, and transmits the signal of the added value to the upper/lower limit value filter 405.

An SOC correcting unit 502 receives the signals of the SOC value of the battery control 103 and the following lower limit value of the upper/lower limit value filter 405, and corrects the following lower limit value on the basis of the SOC value, and transmits the signal of the corrected following lower limit value to the lower limit value output graph searching unit 413. When the SOC value is high, the SOC correcting unit 502 makes a correction value low. When the SOC value is low, the SOC correcting unit 502 makes the correction value high.

In FIG. 17, the control unit 501 may as well delete the gain map 503, the adder 504, and the gain buffer 505.

The fuel cell system of the fifth embodiment can set the following lower limit value in accordance with a change of the SOC value, and achieve the high efficiency of the output electric power of the fuel cell system.

The fuel cell system can generate an adjusted following upper limit value in accordance with the characteristics of the fuel cell system by adding the predetermined gain value to the following upper limit value.

Sixth Embodiment

Figure 18:
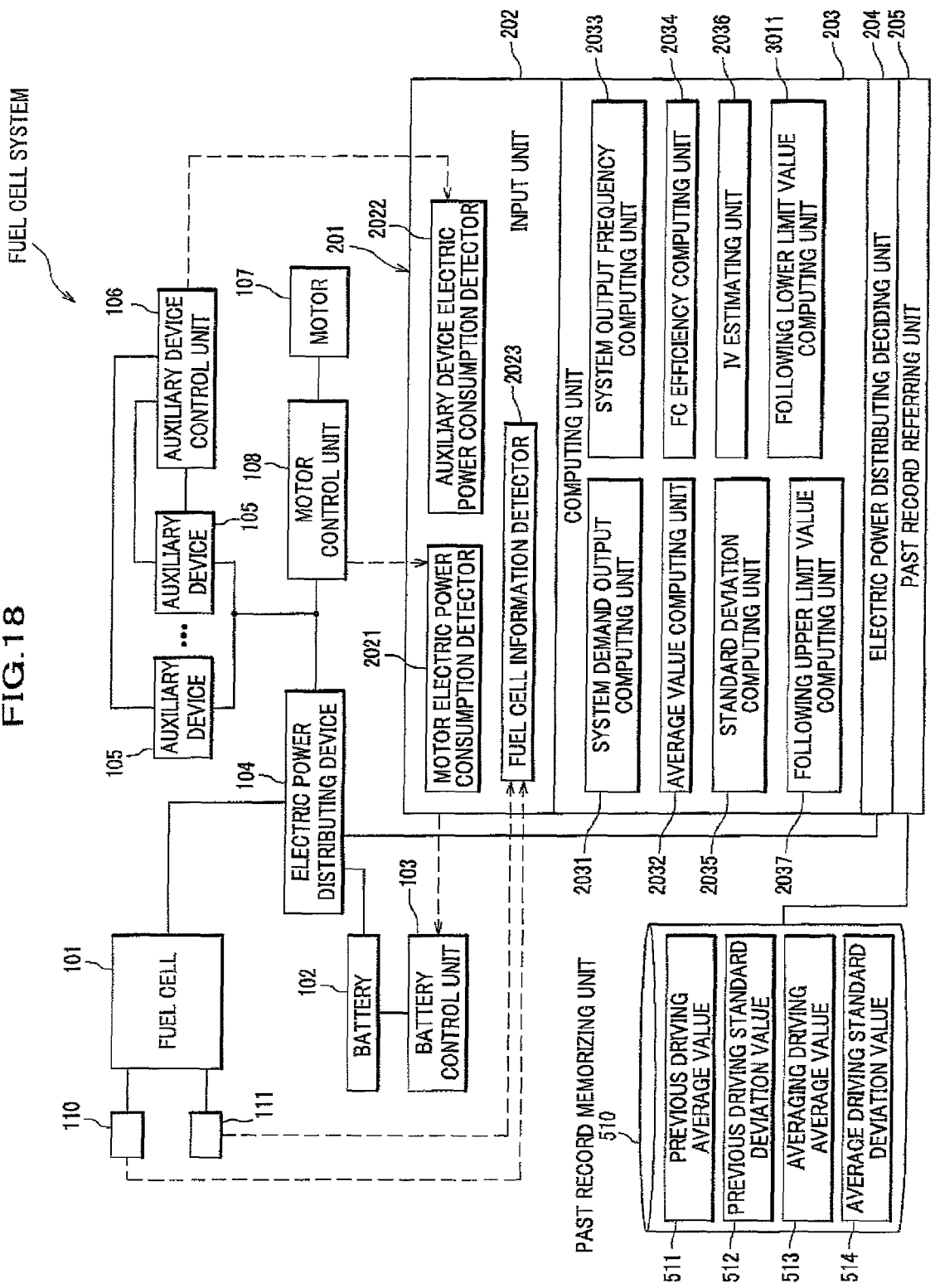
FIG. 18 is a block diagram showing a fuel cell system of a sixth embodiment.

Next, a sixth embodiment will be described with reference to FIG. 18. FIG. 18 shows a fuel cell system of the sixth embodiment. The same parts are designated as the same references of the first to fifth embodiments and duplicated descriptions thereof will be omitted.

As shown in FIG. 18, the fuel cell system of the sixth embodiment includes a control unit 701, a past record referring unit 205, and a past record memorizing unit 510, along with same parts of the third embodiment.

The past record memorizing unit 510 stores a previous driving average value 511, a previous driving standard deviation value 512, an averaging driving average value 513, and an average driving standard deviation value 514. The average value of the sixth embodiment is same as the average value of the output electric power of the fuel cell system in the predetermined time interval in the second embodiment. The standard deviation value is same as the standard deviation value from the average value of the fuel cell system of the second embodiment. The previous driving average value 511 is an average value of the output electric power required for the fuel cell system, which is computed by the average value computing unit 2032 during a previous driving. The previous driving standard deviation value 512 is the standard deviation value of the output electric power of the fuel cell system, which is computed by the standard deviation computing unit 2035 during the previous driving. The previous driving average value 511 is renewed every time the average value computing unit 2032 computes the average value of the output electric power of the fuel cell system. The previous driving standard deviation value 512 is renewed every time the standard deviation computing unit 2035 computes the standard deviation value of the output electric power of the fuel cell system.

The averaging driving average value 513 and the average driving standard deviation value 514 are computed in a laboratory in advance and stored in the past record memorizing unit 510 via the input unit.

In the sixth embodiment, the previous driving average value 511 and the previous driving standard deviation value 512 are described as "learned values" for the convenience sake.

When the ignition is turned on, the past record referring unit 205 gets necessary data stored in the past record memorizing unit 510 and initializes the average value and the standard deviation value of the output electric power of the fuel cell system.

Figure 19:
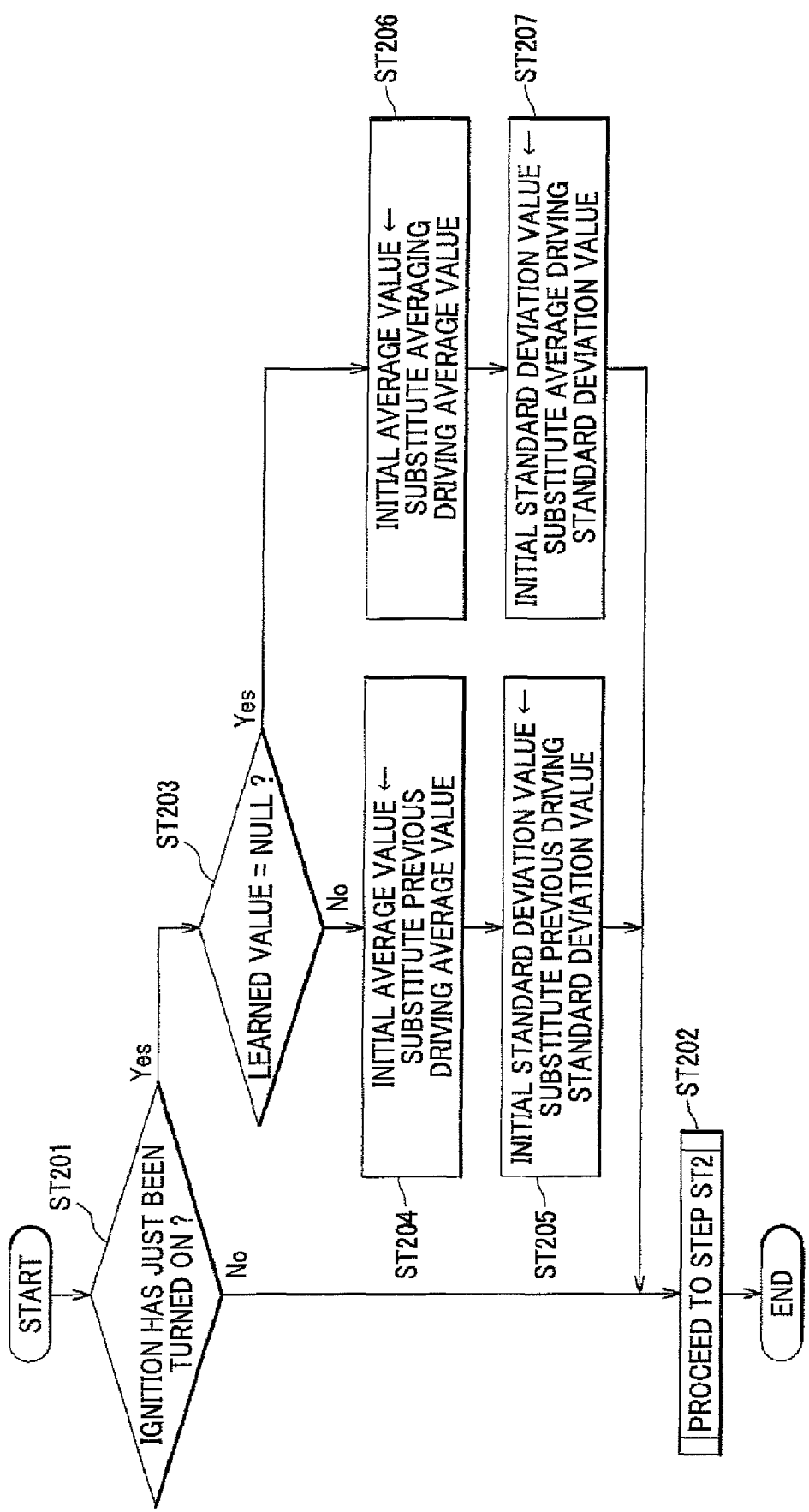
FIG. 19 is a flowchart showing an operation of a control unit of the sixth embodiment.

Next, an operation of the control unit 701 of the fuel cell system of the sixth embodiment will be described with reference to FIG. 18 and FIG. 19 in detail. FIG. 19 shows a flowchart of the operation of the control unit 701. Steps of FIG. 19 follow the step ST1 of FIG. 14.

As shown in FIG. 19, in a step ST201, the control unit 701 determines whether or not the ignition has just been turned on. When the ignition has not just been turned on (step ST1, No), processing proceeds to the step ST2 of FIG. 14 (step ST202).

In the step ST201, when the ignition has just been turned on (step ST201, Yes), the past record referring unit 205 determines whether or not the learned values (the previous driving average value 511 and the previous driving standard deviation value 512) are "NULL" (step ST203). For example, when the learned values stored in a memory are deleted by plugging off a battery, the learned values take on "NULL".

When the learned values are not "NULL" (step ST203, No), the past record referring unit 205 substitutes the previous driving standard deviation value 512 of the past record memorizing unit 510 for an initial standard deviation value of the output electric power required for the fuel cell system (step ST205). Processing proceeds to the step ST2 of FIG. 14 (step ST202).

When the learned values are "NULL" (step ST203, Yes), the past record referring unit 205 substitutes the averaging driving average value 513 of the past record memorizing unit 510 for an initial average value of the output electric power required for the fuel cell system (step ST206). The past record referring unit 205 substitutes the average driving standard deviation value 514 of the past record memorizing unit 510 for an initial standard deviation value of the output electric power required for the fuel cell system (step ST206). Processing proceeds to the step ST2 of FIG. 14 (step ST202).

The fuel cell system of the sixth embodiment can store the average value and standard deviation value of the output electric power required for the fuel cell system during the previous driving, as learned values, and take the average value and standard deviation value for initial values for the next driving. Accordingly, when a similar driving pattern is repeated, the fuel cell system can efficiently generate electricity at a starting time of driving.

The past record memorizing unit 510 may as well store the following upper limit value and the following lower limit value computed during the previous driving as the learned values.

Seventh Embodiment

Figure 20:
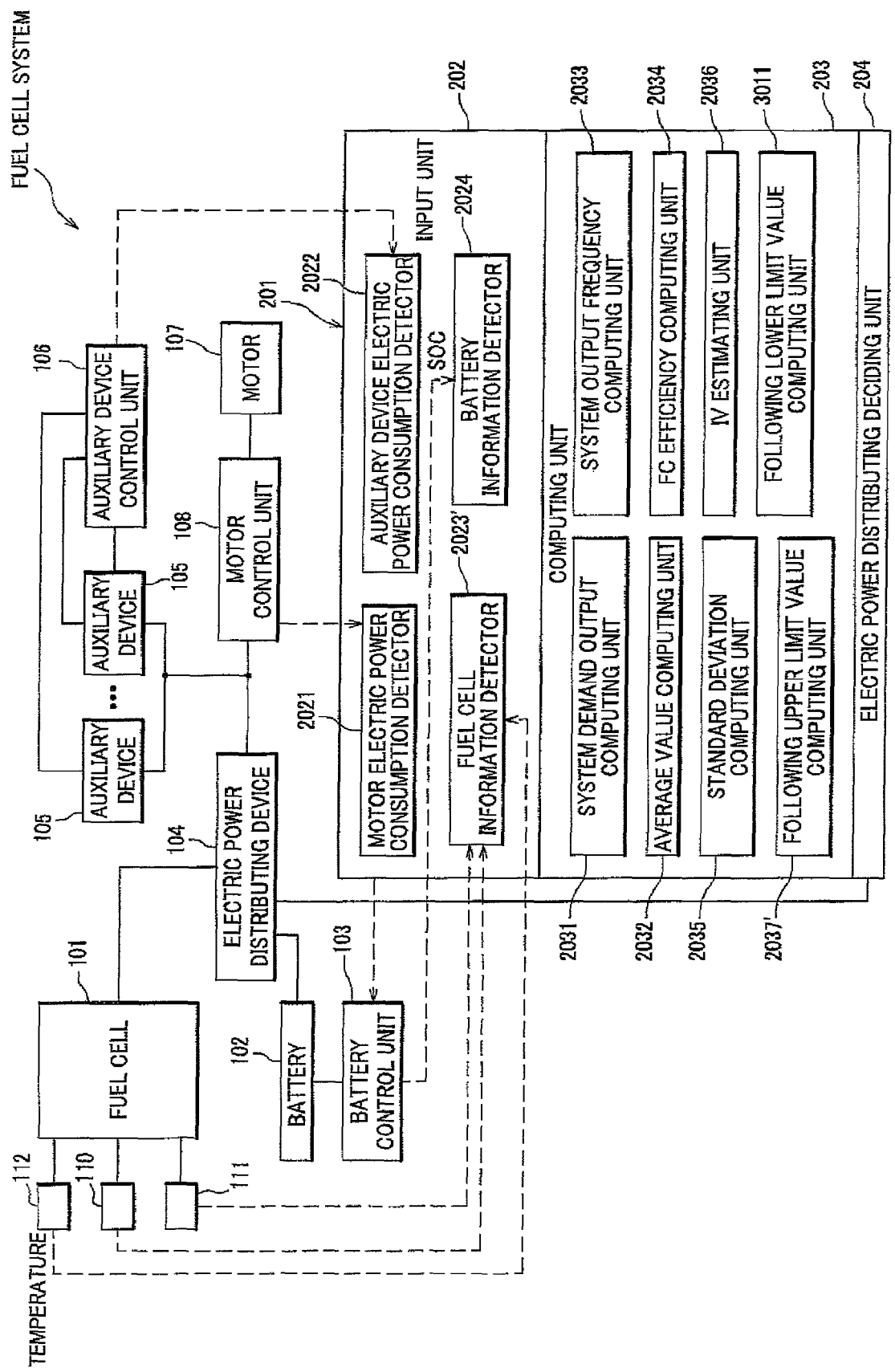
FIG. 20 is a block diagram showing a fuel cell system of a seventh embodiment.

A seventh embodiment will be described with reference to FIG. 20. FIG. 20 is a block diagram showing a fuel cell system of the seventh embodiment. The same parts are designated as the same references of the first to sixth embodiments and duplicated descriptions thereof will be omitted.

As shown in FIG. 20, the fuel cell system of the seventh embodiment includes a control unit 801.

The fuel cell system includes the voltage detector 110, the current detector 109 and an FC temperature detector 112. The control unit 801 is connected to the voltage detector 110, the current detector 109 and the FC temperature detector 112. The FC temperature detector 112 detects a temperature of the fuel cell 101 and transmits a signal of the temperature value to the control unit 801.

The control unit 801 includes an input unit 202, which includes a motor electric power consumption detector 2021, an auxiliary device electric power consumption detector 2022, an FC (fuel cell) information detector 2023' and a battery information detector 2024 which receives a signal of SOC information of the battery 102 from a battery control unit 103. The FC information detector 2023' receives the signals of a voltage value and a current value of the fuel cell 101 and the signal of a temperature of the fuel cell detected by the FC temperature detector 112. A following upper limit value computing unit 2037' includes an SOC/temperature correcting graph searching unit 415 and a multiplying unit 416, which are described later in relation to FIG. 23.

Figure 21:
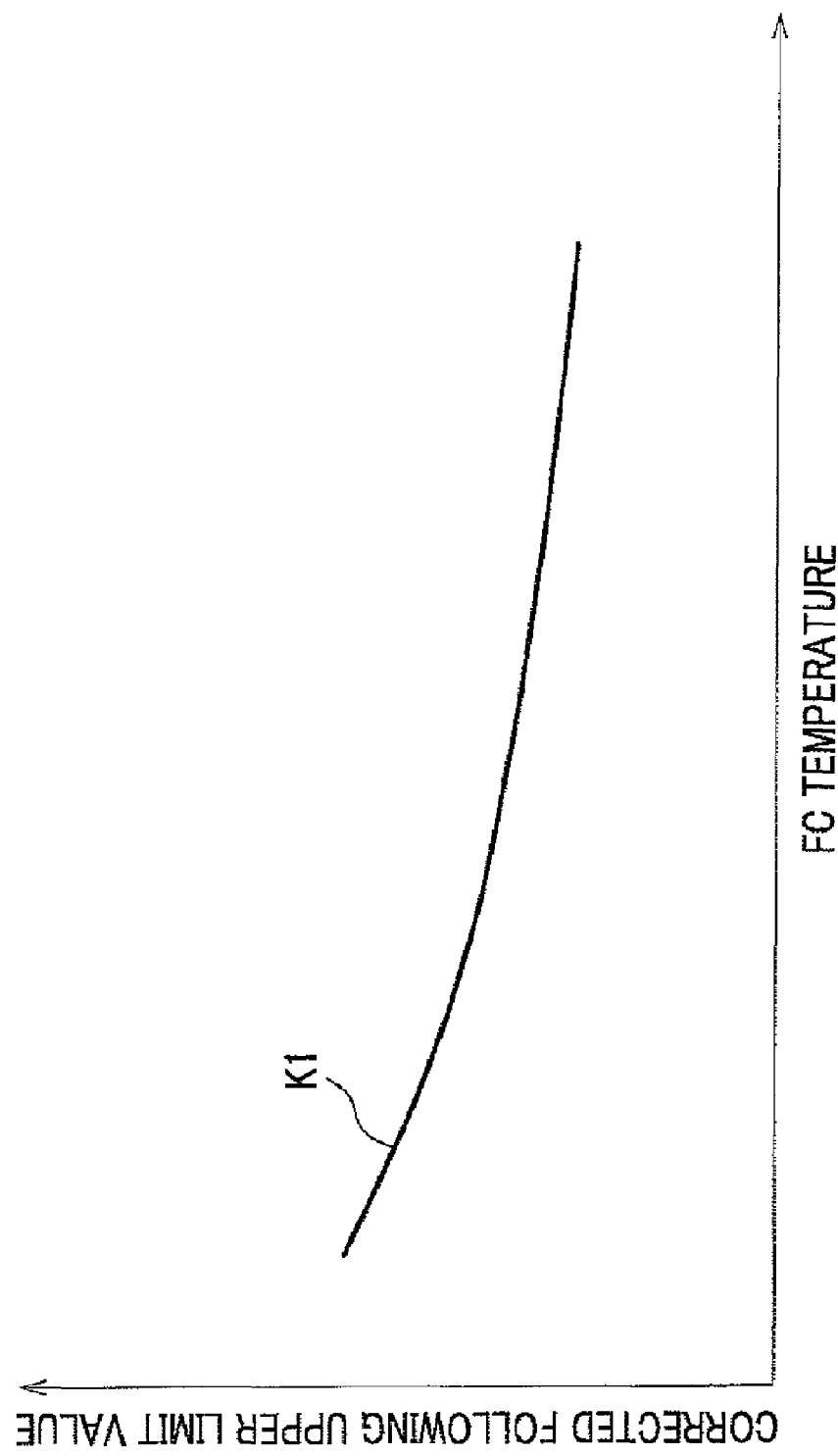
FIG. 21 is a diagram showing a characteristic curve of a corrected following upper limit value corresponding to a temperature of the fuel cell.
Figure 22:
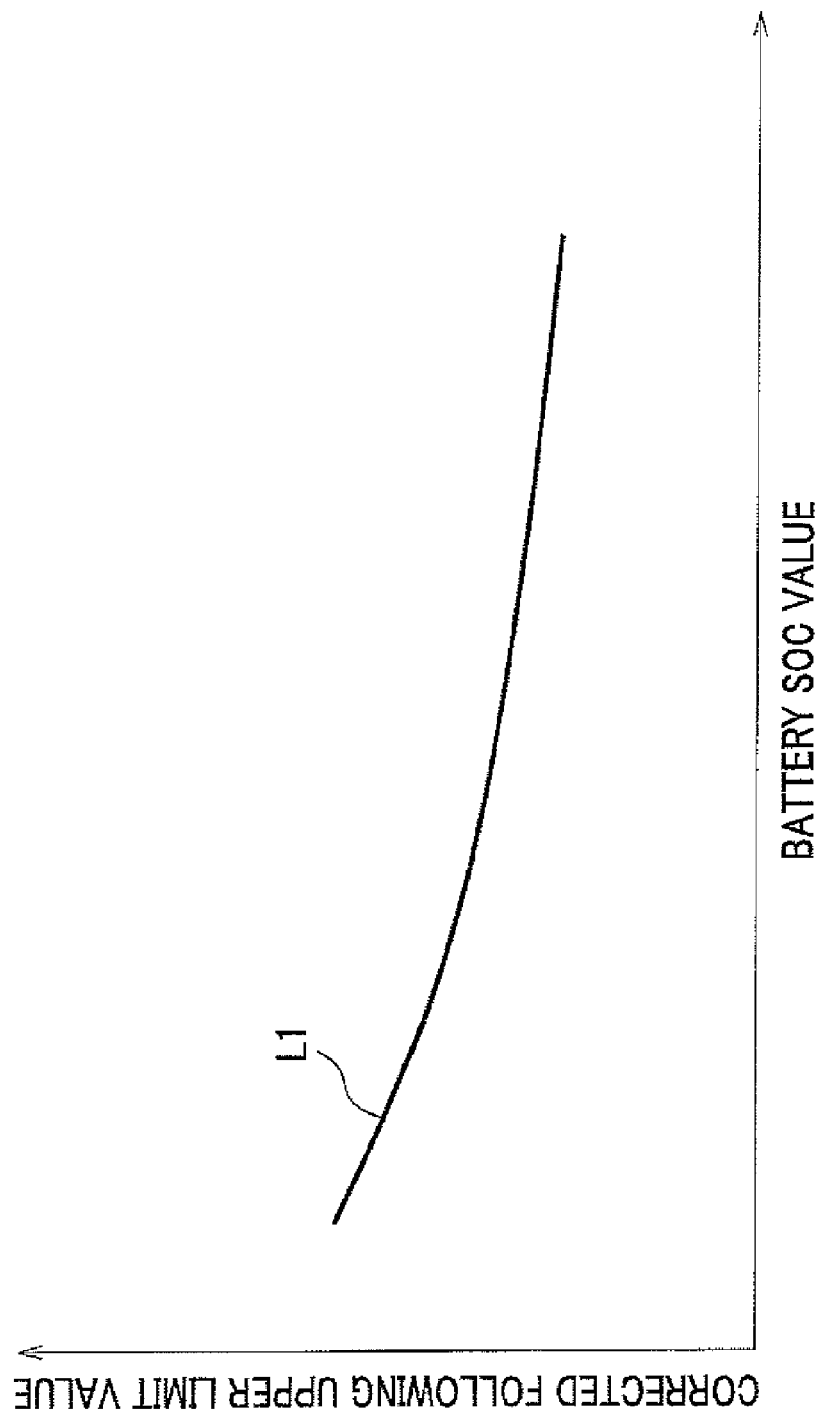
FIG. 22 is a diagram showing a characteristic curve of the corrected following upper limit value corresponding to a SOC value of a battery.

FIG. 21 and FIG. 22 are graphs showing an operation of the fuel cell system of the seventh embodiment, which illustrates a corrected following upper limit value. In FIG. 21, a vertical axis shows a corrected following upper limit value, and a horizontal axis shows a temperature (FC temperature) of the fuel cell 101 (FIG. 20). As shown with a characteristic curve K1 in FIG. 21, the corrected following upper limit value increases as the temperature of the fuel cell drops.

In FIG. 22, a vertical axis shows the corrected following upper limit value, and a horizontal axis shows an SOC (state of charge) value of the battery 102 (FIG. 20). As shown with a characteristic curve L1 in FIG. 22, the corrected following upper limit value increases as the SOC value of the battery 102 drops.

Figure 23:
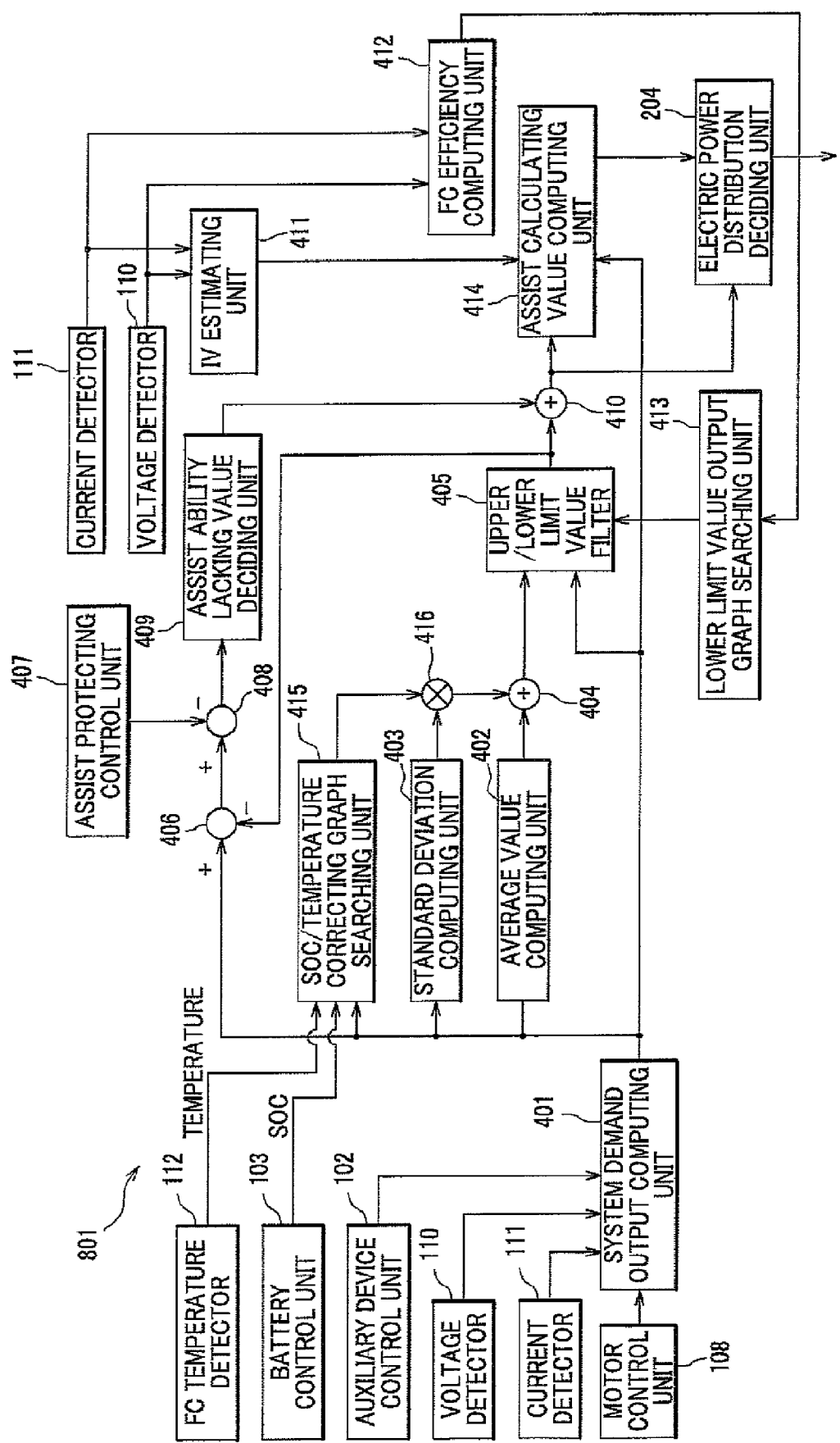
FIG. 23 is a block diagram showing a control unit of the seventh embodiment.

FIG. 23 is a block diagram showing the control unit 801 of the fuel cell system of the seventh embodiment.

As shown in FIG. 23, the control unit 801 includes a SOC/temperature correcting graph searching unit 415 (corresponding to the following upper limit value computing unit 2037' in FIG. 20), and a multiplying unit 416 (corresponding to the following upper limit value computing unit 2037' in FIG. 20), and in addition to the components shown in FIG. 13.

The average value computing unit 402 computes an average value collected by the output electric power required for the fuel cell system for a predetermined time period, and the standard deviation computing unit 403 computes a standard deviation value of the output electric power required for the fuel cell system for the predetermined time period. The SOC/temperature correcting graph searching unit 415 computes the corrected following upper limit value by searching the graphs of FIG. 21 and FIG. 22 on the basis of the SOC value of the battery information detector 2024 and the temperature of the fuel cell 101 which the FC information detector 2023' detects. The multiplying unit 416 multiplies the standard deviation value of the standard deviation computing unit 403 by the corrected following upper limit value of the SOC/temperature correcting graph searching unit 415. The adder 404 adds the average value of the average value computing unit 402 to a multiplied value of the multiplying unit 416. Subsequently, the adder 404 outputs a following upper limit value, which is transmitted to the upper/lower limit value filter 405. The following upper limit value is increased, as the temperature of the fuel cell drops, or as the SOC value of the battery 102 drops. The subsequent process is same as in FIG. 13 and FIG. 14, and thus duplicated descriptions thereof will be omitted.

The fuel cell system of the seventh embodiment can quickly warm up the fuel cell 101 because the fuel cell 101 can generate electricity above the following upper limit value determined on the basis of the standard deviation value by raising the following upper limit value as a temperature of the electric power generator becomes low as shown in FIG. 21.

For example, under a low temperature condition, when the output electric power of the fuel cell 101 is increased so as to be warmed up, a large amount of surplus electric power (surplus power) is generated. The surplus power is stored in the battery 102 (FIG. 20). Accordingly, a remaining capacity of the battery 102 is drastically reduced, the fuel cell cannot be warmed up, and the battery cannot be charged with a regenerated electric power from the motor 107. On the other hand, even when the remaining capacity of the battery is still available, the electric power generated by the fuel cell 101 is supplied to the motor 107 after stored once the battery 102. Consequently, the efficiency of the fuel cell system is dropped.

According to the seventh embodiment, the fuel cell following region of the fuel cell 101 is expanded upwardly by raising the following upper limit value as the temperature of the fuel cell lowers to increase the output generated electric power of the fuel cell 101. Consequently, the fuel cell system of the seventh embodiment can warm up the fuel cell while generating electricity with the fuel cell 101 which is suited for traveling. Furthermore, as compared with the case where the output power of the fuel cell 101 itself is increased, the decrease in a remaining capacity of the battery 102 due to the surplus power is suppressed. Accordingly, there is prevented a case where the battery 102 is fully charged, may otherwise hamper warming-up of the fuel cell 101 and collection of the regenerated electric power. In addition the efficiency of the output electric power is expected to improve.

As shown in FIG. 22, the fuel cell following region of the fuel cell 101 is expanded upwardly by raising the following upper limit value as the SOC value of the battery 102 drops. Consequently, the output electric power of the fuel cell 101 is increased. The fuel cell system can prevent the remaining capacity of the battery 102 from drastically reducing due to the surplus power by supplying a part of the increased output electric power to the battery 102.

The various components, such as the electric power distribution deciding unit 204, the system demand output computing unit 2031, the average value computing unit 2032, the system output frequency computing unit 2033, the FC efficiency computing unit 2034, the standard deviation computing unit 2035, the IV estimating unit 2036, the following upper limit value computing units 2037 and 2037', the following lower limit value computing unit 3011, the system demand output computing unit 401, the average value computing unit 402, the standard deviation computing unit 403, the adders 404 and 410, the upper/lower limit value filter 405, the subtractors 406 and 408, the assist protecting control unit 407, the assist ability lacking value deciding unit 409, the IV estimating unit 411, the lower limit value output graph searching unit 413, the assist calculating value computing unit 414, the SOC correcting unit 502, the gain map 503, the adder 504, the gain buffer 505 shown in FIG. 2, 5, 13, 17, 20, 23, are realized by implementing programs by a CPU (central processing unit), which are stored in a memory unit, such as a ROM (read-only memory, not shown) and expanded in a RAM (random access memory).

Modified Embodiment

The fuel cell system of the present invention can prevent an excess of electricity discharged by a chargeable device and can be applied to a movable power generator such as a vehicle, a boat, an airplane and a portable power generator or to a household small-size power generator.

In the embodiments of the present invention, the fuel cell system generates the following upper limit value by adding the standard deviation value to an average value of the output electric power of the fuel cell system in a past predetermined time period and the follow lower limit value by subtracting the standard deviation value from the average value of the output electric power of the fuel cell system in the past predetermined time period. However, the present invention is not limited to the embodiments, but may be modified. For example, the following upper limit value or the following lower limit value can be computed by adding or subtracting various values such as 1.5σ, 1.96σ, or 0.7σ, to or from the average value, respectively, where the standard deviation value is represented as "σ".

Figure 24:
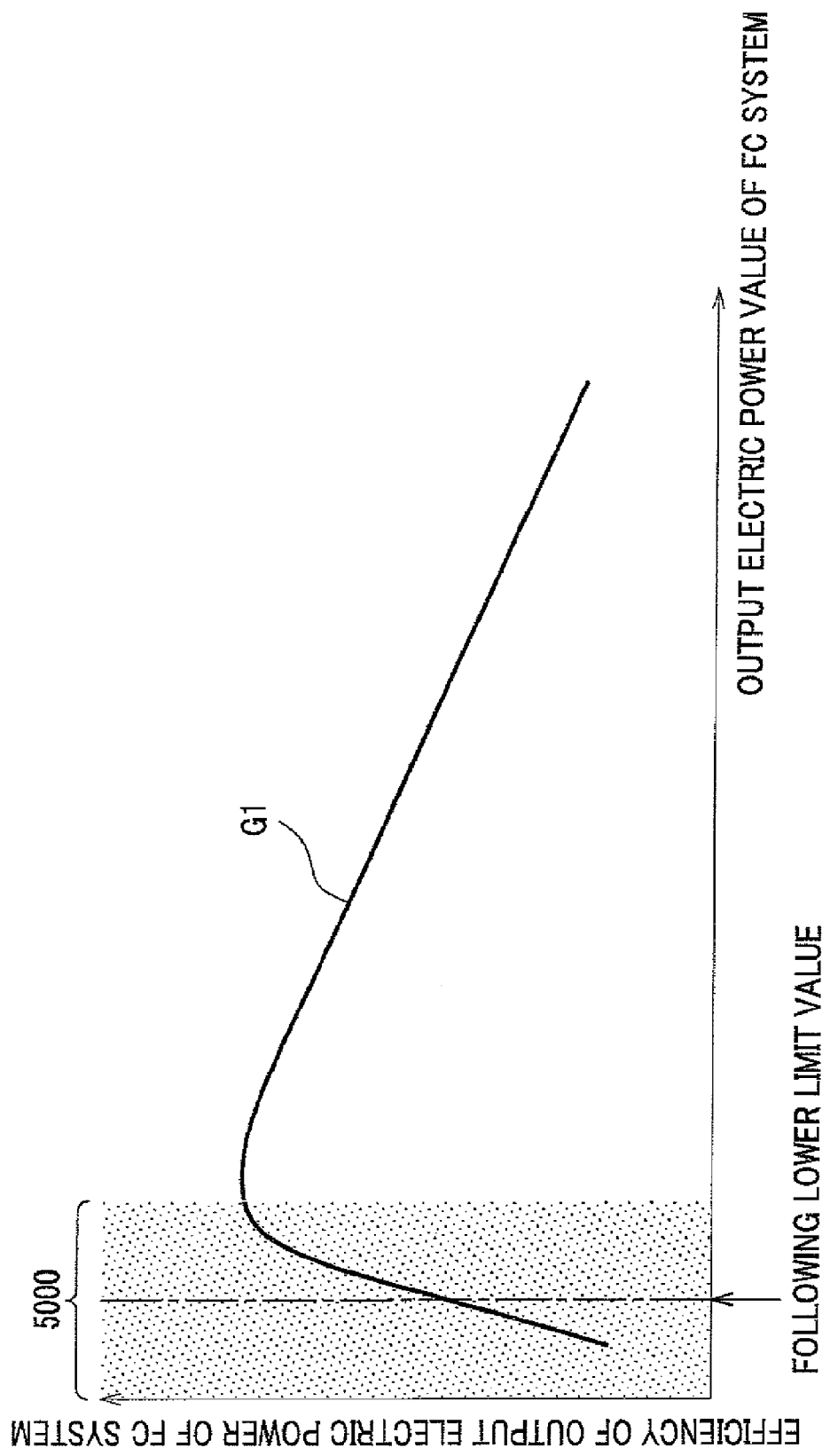
FIG. 24 is a diagram showing a light-load region and a characteristic curve of the efficiency of the output electric power of the fuel cell of the sixth embodiment.

In the embodiments above, the following lower limit value is determined based on the graphs of FIG. 9 to FIG. 12, but may be determined based on a graph of FIG. 24.

FIG. 24 shows an operation of the fuel cell system of the fourth embodiment. In FIG. 24, the same parts are designated as the same references of FIG. 9 and duplicated descriptions thereof will be omitted. As shown in FIG. 24, the following lower limit value may as well be determined on the basis of a value on the characteristic curve G1 in a light-load region 5000. An appropriate value in the light-load region 5000 can be selected for the following lower limit value on the basis of an experiment in advance. The light-load region 5000 covers a region below the output electric power value of the fuel cell system, that attains the highest efficiency on the characteristic curve G1 in FIG. 24. The experiment may be performed in advance to determine the output electric power value where the fuel cell 101 begins to deteriorate as will be described later, and in an range of values below this output electric power value, the following lower limit value may as well be set. Accordingly, the following lower limit value can be a predetermined output electric power value in the light-load region where the deterioration of the fuel cell progresses. The light-load region will be described below.

When sufficient hydrogen is supplied to an anode of the fuel cell 101 (the output electric power of the fuel cell is normal), a chemical reaction represented by the following formula (F2) progresses.

$$H_2 \rightarrow 2H^+ + 2e^- \tag{F2}$$

However, when the output electric power of the fuel cell 101 is low, and a flow rate of hydrogen is low, hydrogen supplied to the anode is not sufficient. In this case, the following reactions represented by formulas (F3) and (F4) progress in the fuel cell 101.

$$C + H_2O \rightarrow CO_2 + 4H^+ + 4e^+ \tag{F3}$$

$$Pt \rightarrow Pt_2^+ + 2e^+ \tag{F4}$$

In the formula (F3), "C" indicates the carbon in an electrode. In the formula (F4), "Pt" is a catalysis. When hydrogen is not sufficiently supplied, electrons of the components of the fuel cell 101 are supplied. Consequently, the fuel cell is deteriorated. The light-load region means an output region in which insufficient hydrogen supply leads to deterioration of the fuel cell 101.

The following lower limit value is determined as shown in FIG. 24 in the light-load region where the hydrogen is insufficiently supplied. Accordingly, the deterioration of the fuel cell 101 can be prevented by increasing the distribution of the output electric power to be supplied from the battery 102 or by stopping the operation of the fuel cell 101.

What is claimed is:

1. An electric power supply system comprising:
   an electric power generator for generating electric power;
   an electricity storage device that is charged with the electric power from the electric power generator, and supplying electric power to an electrical load;
   an electric power distributing device for distributing electric power to the electrical load from the electric power generator and the electricity storage device according to a sharing ratio; and
   a control unit for determining the sharing ratio of the electric power and for causing the electric power distributing device to output the electric power from the electric power generator and the electricity storage device according to the sharing ratio, wherein
   the control unit determines a frequency distribution representing a frequency of a given magnitude of electric power that is demanded from the electric power supply system over a period of time, the frequency distribution determined for a plurality of magnitudes, the frequency distribution including an assist region and a fuel cell following region, the assist region comprising a range of magnitudes in the frequency distribution for which an amount of power demanded from the electric power supply system is demanded less frequently than a range of magnitudes in the fuel cell following region, and
   a value of the sharing ratio of the electricity storage device in the assist region is higher than a value of the sharing ratio of the electricity storage device in the fuel cell following region.

2. The electric power supply system according to claim 1, wherein the control unit generates a following upper limit value by adding an average value of the electric power of the electric power supply system and a value corresponding to a standard deviation determined by the frequency distribution for the electric power, wherein, when the electric power of the electric power supply system is lower than the following upper limit value, a high frequency of the magnitude of electric power is in the fuel cell following region of the frequency distribution of the electric power of the electric power supply system regarding the magnitude of the electric power, and wherein, when the electric power of the electric power supply system is equal to or higher than the following upper limit value, a low frequency of the magnitude of the electric power is in the assist region of the frequency distribution of the output electric power of the electric power supply system.

3. The electric power supply system according to claim 1, wherein the electric power generator is a fuel cell, and the control unit computes an efficiency of the electric power of the fuel cell in operation and selects a following lower limit value from a value of an output electric power of the fuel cell that maximizes the efficiency of the output electric power of the fuel cell, and a predetermined value of the output electric power in a light-load region where deterioration of the fuel cell progresses, and wherein, when the output electric power of the fuel cell is equal to or higher than the following lower limit value, the control unit determines the sharing ratio of the output electric power to the fuel cell and the electricity storage device so as to increase and decrease the output electric power supplied by the fuel cell in accordance with the output electric power required for the electric power supply system.

4. The electric power supply system according to claim 3, further comprising an auxiliary device electric power consumption detecting unit for detecting an electric power consumption by auxiliary devices of the fuel cell, a voltage detecting unit, and a current detecting unit, wherein the control unit computes an efficiency of the output electric power of the fuel cell on a basis of the electric power consumption by the auxiliary devices and current-voltage characteristics of the fuel cell, of which a voltage is detected by the voltage detecting unit, and a current is detected by the current detecting unit.

5. The electric power supply system according to claim 3, further comprising a temperature detecting unit for detecting a temperature of the fuel cell wherein the control unit computes an efficiency of the output electric power of the fuel cell on a basis of the temperature of the fuel cell detected by the temperature detecting unit.

6. The electric power supply system according to claim 3, wherein the control unit comprises a humidity detecting unit for detecting a humidity of the fuel cell and computes an efficiency of the output electric power of the fuel cell on a basis of the humidity of the fuel cell which the humidity detecting unit detects.

7. The electric power supply system according to claim 3, further comprising a pressure detecting unit for detecting a pressure of the fuel cell wherein the control unit computes an efficiency of the output electric power of the fuel cell on a basis of the pressure of the fuel cell detected by the pressure detecting unit.

8. The electric power supply system according to claim 3, wherein the control unit stops electricity generated by the fuel cell when a value of the output electric power required for the fuel cell is lower than the following lower limit value.

9. The electric power supply system according to claim 2, wherein the control unit raises the following upper limit value as a temperature of the fuel cell detected by a temperature detecting unit lowers.

10. The electric power supply system according to claim 2, wherein the control unit raises the following upper limit value as a remaining capacity of the electricity storage device detected by a remaining capacity detecting unit decreases.

11. A method of limiting an excess of discharging from a fuel cell system comprising:
   an electric power supply system comprising:
      an electric power generator for generating an electric power;
      an electricity storage device for receiving and charging the electric power from the electric power generator, and supplying the electric power to an electrical load;
      an electric power distributing device for distributing the electric power to the electrical load from the electric power generator and the electricity storage device according to a sharing ratio; and
      a control unit for determining the sharing ratio of the electric power and controlling the electric power distributing device according to the sharing ratio,
   wherein the method comprises the steps of:
      determining a frequency distribution representing a frequency of a given magnitude of electric power that is demanded from the electric power supply system over a period of time, the frequency distribution determined for a plurality of magnitudes, the frequency distribution including an assist region and a fuel cell following region, the assist region comprising a range of magnitudes in the frequency distribution for which an amount of power demanded from the electric power supply system is demanded less frequently than a range of magnitudes in the fuel cell following region;
      causing the electric power distributing device to output the electric power from the electric power generator and the electricity storage device according to the sharing ratio, wherein
   a value of the sharing ratio of the electricity storage device in the assist region is higher than a value of the sharing ratio of the electricity storage device in the fuel cell following region.

* * * * *